United States Patent
Shiraki et al.

(10) Patent No.: US 8,345,579 B2
(45) Date of Patent: Jan. 1, 2013

(54) RELAY DEVICE SUPPRESSING FRAME FLOODING

(75) Inventors: Osamu Shiraki, Kawasaki (JP); Takeshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 12/801,371

(22) Filed: Jun. 4, 2010

(65) Prior Publication Data

US 2010/0316057 A1    Dec. 16, 2010

(30) Foreign Application Priority Data

Jun. 15, 2009  (JP) .................................. 2009-142513
Sep. 3, 2009   (JP) .................................. 2009-203358

(51) Int. Cl.
*H04L 12/28*   (2006.01)
(52) U.S. Cl. ........................................ 370/254; 370/401
(58) Field of Classification Search ................ 370/229, 370/230, 254–256, 389, 401
See application file for complete search history.

(56) References Cited

U.S. PATENT DOCUMENTS

| 7,116,672 | B1 * | 10/2006 | Sivakumar | 370/395.4 |
| 7,990,871 | B2 * | 8/2011 | Wong et al. | 370/235 |
| 8,116,310 | B2 * | 2/2012 | Boers et al. | 370/389 |
| 2003/0118035 | A1 * | 6/2003 | Sharma et al. | 370/401 |
| 2003/0142680 | A1 | 7/2003 | Oguchi | |
| 2003/0208571 | A1 * | 11/2003 | Yik et al. | 709/223 |
| 2007/0230469 | A1 * | 10/2007 | Teshima | 370/392 |
| 2008/0080498 | A1 | 4/2008 | Yoon | |
| 2009/0135722 | A1 * | 5/2009 | Boers et al. | 370/236 |

FOREIGN PATENT DOCUMENTS

| JP | 2003-218901 | 7/2003 |
| JP | 2005-303410 | 10/2005 |
| JP | 2006-352544 | 12/2006 |
| JP | 2008-92542 | 4/2008 |
| JP | 2008-177677 | 7/2008 |

* cited by examiner

*Primary Examiner* — Hong Cho
(74) *Attorney, Agent, or Firm* — Staas & Halsey LLP

(57) ABSTRACT

In a relay device, a first memory stores correspondence information representing a correspondence relationship between a node and a port. A second memory stores information by which a port to suppress flooding of a frame is distinguishable. A relay part limits a port, which floods a frame addressed to a node of which information is not stored in the first memory, based on the information stored in the second memory.

12 Claims, 33 Drawing Sheets

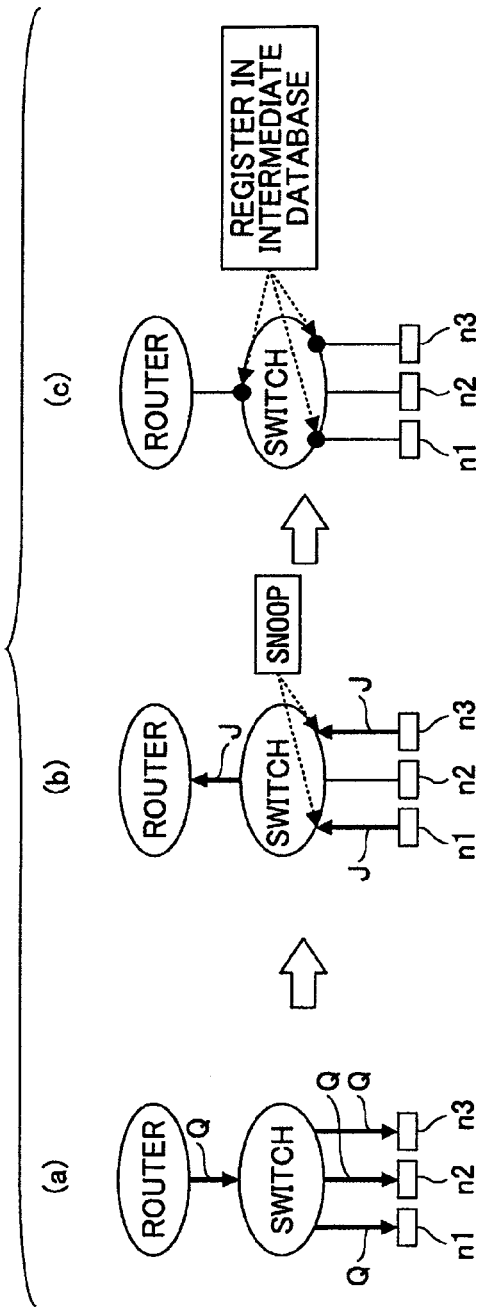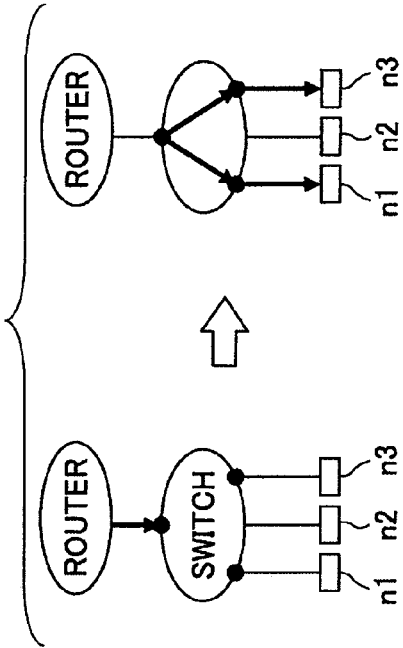

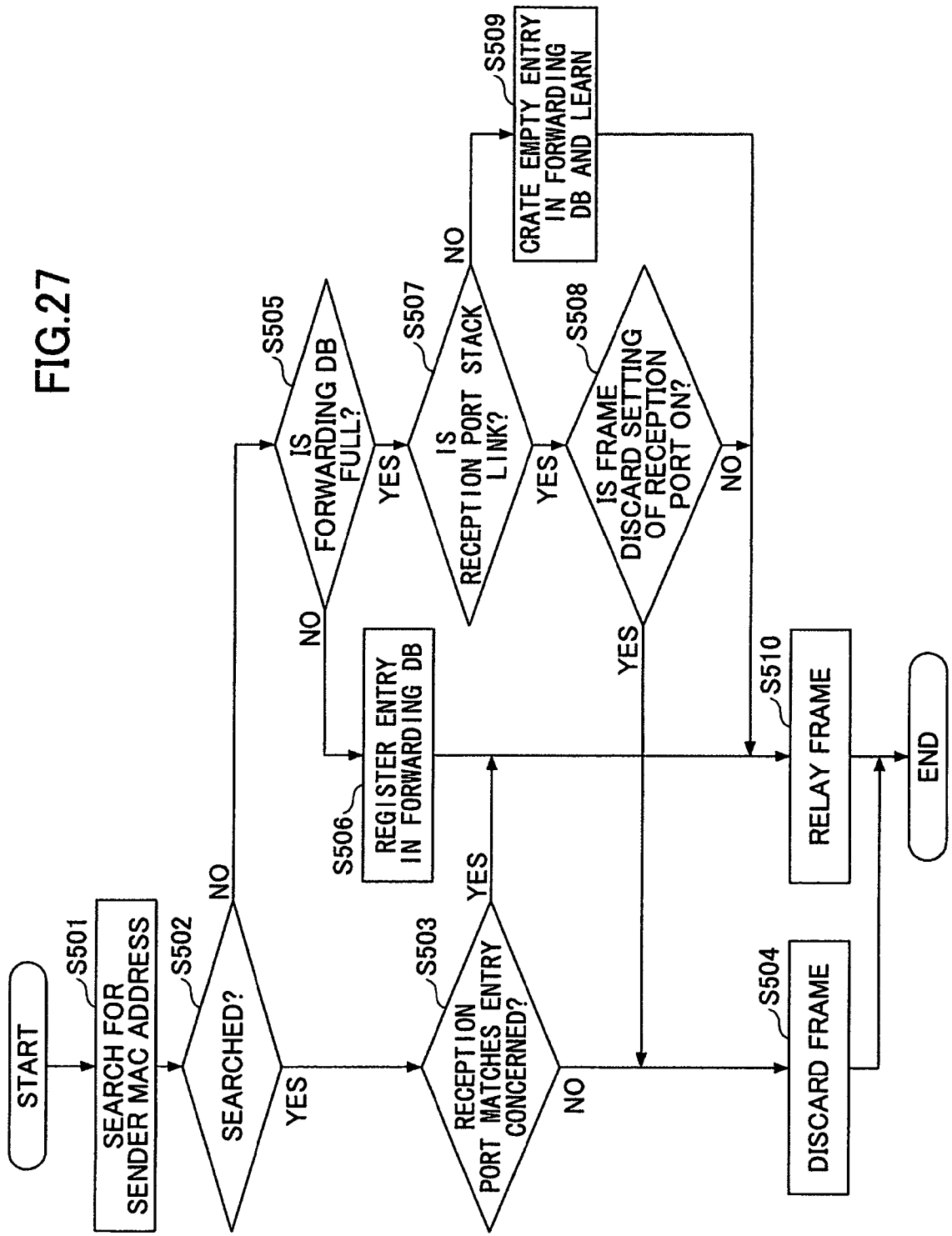

RELAY DEVICE SUPPRESSING FRAME FLOODING

CROSS-REFERENCE TO RELATED APPLICATIONS

This application is based upon and claims the benefit of priority of the prior Japanese Patent Applications No. 2009-142513, filed on Jun. 15, 2009, and No. 2009-203358, filed on Sep. 3, 2009, the entire contents of which are incorporated herein by reference.

FIELD

The embodiment discussed herein is directed to a relay device for relaying a frame in a layer 2 of a network system.

BACKGROUND

FIGS. 1A and 1B are illustrations of a network structure containing a switch stacking. The stacking of switches (layer 2 switches) is to display a plurality of switches as a single switch by stack-connecting the plurality of switches. The stacking of switches may be referred to as virtualization of switches. FIG. 1A illustrates a physical structure of a network. In FIG. 1A, four switches (SW-A through SW-D) are connected through stack links L1 through L4. FIG. 1B illustrates a logical structure of the network of FIG. 1A. In FIG. 1B, the four switches that are stack-connected are displayed logically as a single switch V. In this case, a user can manage the four switches (SW-A through SW-D) integrally as a single switch (the switch V).

In the switch stacking, generally a redundant path is provided as a stack link. This is to permit a frame relay by using the redundant path as an alternative path when a malfunction occurs in one of the stack links. In FIG. 1A, the stack link L4 corresponds to the redundant path. For example, if the stack link L3, which connects between the switch SW-C and the switch SW-D, is out of use due to a failure, frames are sent to the stack link L4 to detour the stack link L3, thereby permitting communications between the switch SW-C and the switch SW-D.

However, if a loop is formed by the redundant path in the network, there is a problem in that a frame storm may occur if an appropriate action is not taken.

As an appropriate action for eliminating such a problem caused by a loop formed by a redundant path, there are the following conventional methods.

1. A control method according to STP (Scanning Tree Protocol).
2. A control method by including TTL (Time to live) in a frame.
3. A method of deciding a relay path at a frame transferer.

FIG. 2 is an illustration for explaining the control method according to STP. According to STP, a redundant path is appropriately cut (blocked) so that a network loop is not formed. In FIG. 2, a port connected to the stack link L4 is blocked in each of the switches SW-A and SW-D. According to STP, even if a problem occurs in an unblocked link and a communication between some switches cannot be performed, the communication between the switches concerned is permitted by switching the path by enabling the redundant path, which has been blocked.

FIG. 3 is an illustration for explaining the control method by including TTL in a frame. According to this method, TTL is included in a frame and the TTL is subjected to subtraction each time the frame passes one of switches so that the frame is discarded when the TTL becomes equal to zero. As a result, the frame is prevented from circulating in a network infinitely, which substantially eliminates formation of a loop. In the example of FIG. 3, a frame F1 containing TTL, which is equal to 1, is sent from the switch SW-D in a direction toward the switch SW-D. The frame F1 is not sent to a stack link beyond the switch SW-A, and a frame F2 is not sent to a stack link beyond the switch SW-B.

FIG. 4 is an illustration for explaining a method of deciding a path at a frame transferer. According to this method, a relay path within a stack is decided by one of switches contained in the stack, which one receives the frame first. In FIG. 4, a path is decided by the switch SW-D, and a frame F3 containing information (path information) regarding the decided path is sent to the switch SW-A. The switch SW-A performs a relay process in accordance with the path information contained in the frame F3.

Moreover, other methods are suggested as a technique to solve the loop problem, such as, for example, in Japanese Laid-Open Patent Application No. 2008-177677.

However, in STP, there is a problem in that a link in a blocked state cannot be utilized. That is, because frames other than a control frame are not transferred by the link in a blocked state in a normal condition, an average hop count becomes large. As a result, a load to a link shared by switches is increased, which generates frame congestion.

Moreover, there is a problem in that the method to include TTL in the frame is effective only for a switch corresponding to the TTL concerned. That is, TTL is not standardized in a layer 2 frame.

Further, in a case where a path is decided at a frame transferer, each switch is required to process a special format frame containing relay information. A function to register a path and seek for a path is required for each switch.

SUMMARY

According to an aspect of the invention, a relay device includes: a first memory configured to store correspondence information representing a correspondence relationship between a node and a port; a second memory configured to store information by which a port to suppress flooding of a frame is distinguishable; and a relay part configured to limit a port, which floods a frame addressed to a node of which information is not stored in the first memory, based on the information stored in the second memory.

According to another aspect of the invention, a relay method performed by a relay device includes: storing correspondence information in a first memory of the relay device, the correspondence information representing a correspondence relationship between a node and a port; storing information by which a port to suppress flooding of a frame is distinguishable in a second memory of the relay device; and limiting a port, which floods a frame addressed to a node of which information is not stored in the first memory, based on the information stored in the second memory.

According to a further aspect of the invention, a relay device performing a frame relay includes: a first memory configured to store correspondence information representing a correspondence relationship between a node and a port; a frame discarding part configured to discard a frame of which sender is the node of which correspondence information is stored in the first memory when the frame of which sender is the node of which correspondence information is stored is received at a port different from the port to which the node of which correspondence information is stored is related; and a third memory configured to store, when a frame of which destination is not stored in the first memory is received, information indicating that the frame of which destination is not stored in the first memory should be discarded, wherein the discarding part discards a frame, which is received at a port connected to a redundant path and a destination thereof is not stored in the third memory, based on the information stored in the third memory when the first memory is in a saturated state.

According to yet another aspect of the invention, a relay method performed by a relay device performing a frame relay includes: storing correspondence information representing a correspondence relationship between a node and a port in a first memory; discarding a frame of which sender is a node of which correspondence information is stored in the first memory when the frame is received at a port different from the port to which the node of which correspondence information is stored is related; and storing in a third memory, when a frame of which destination is not stored in the first memory is received, information indicating that the frame of which destination is not stored in the first memory should be discarded, wherein the discarding a frame including discarding a frame, which is received at a port connected to a redundant path and a destination thereof is not stored in the third memory, based on the information stored in the third memory when the first memory is in a saturated state.

The object and advantages of the embodiment will be realized and attained by means of the elements and combinations particularly pointed out in the appended claims.

It is to be understood that both the foregoing general description and the following detailed description are exemplary explanatory only and are not restrictive of the invention, as claimed.

BRIEF DESCRIPTION OF DRAWINGS

FIGS. 18A and 18B are illustrations for explaining IGMP snooping;

FIG. 27 is a flowchart for explaining an operation of a switch according to a fifth embodiment when receiving a frame;

DESCRIPTION OF EMBODIMENT(S)

Preferred embodiment of the present invention will be explained with reference to the accompanying drawings.

Figure 1B:
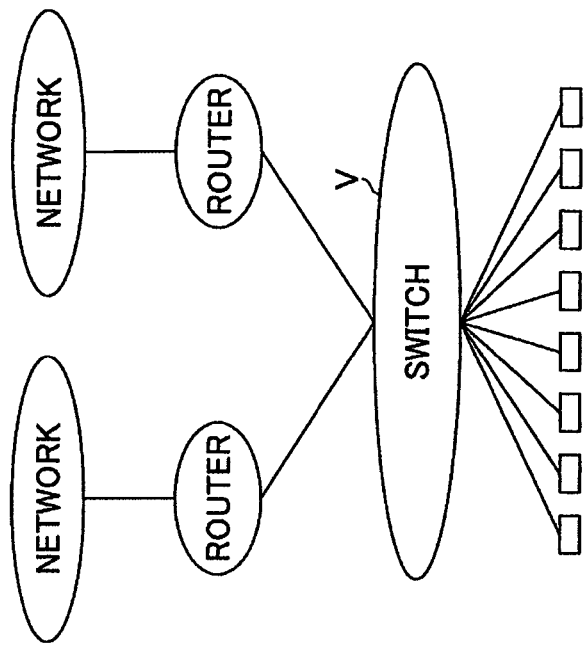
FIGS. 1A and 1B are illustrations of a network structure containing a switch stacking.
Figure 1A:
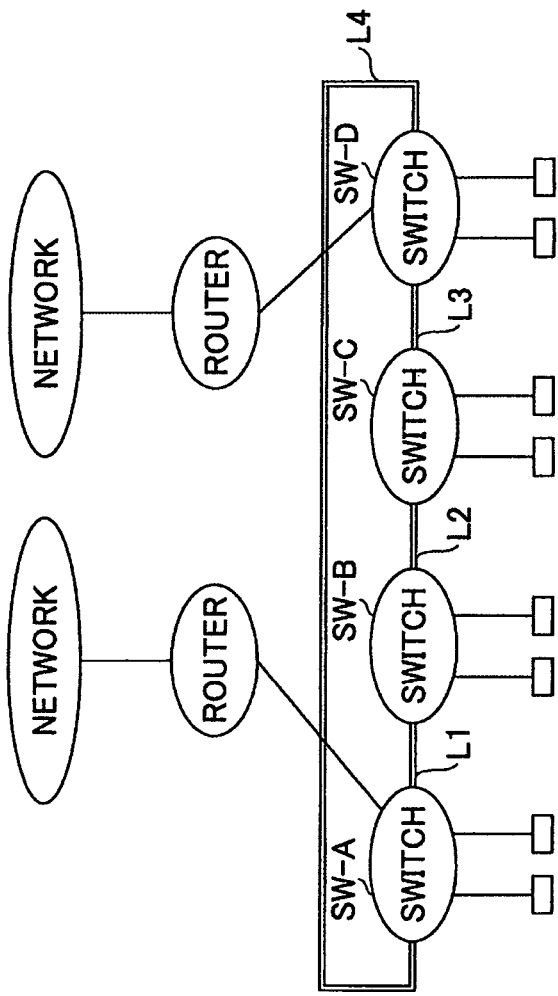
Figure 2:
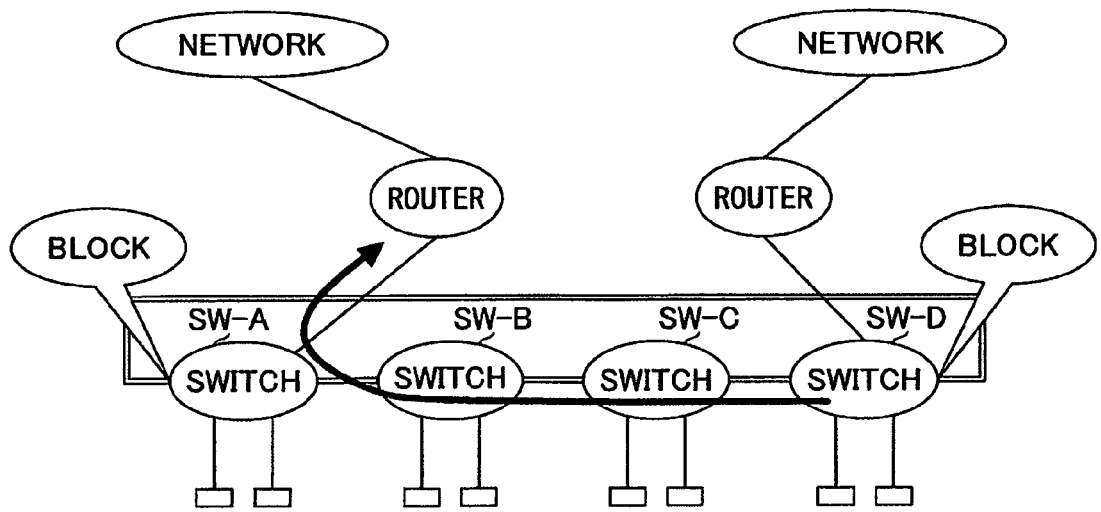
FIG. 2 is an illustration for explaining a control method according to STP.
Figure 3:
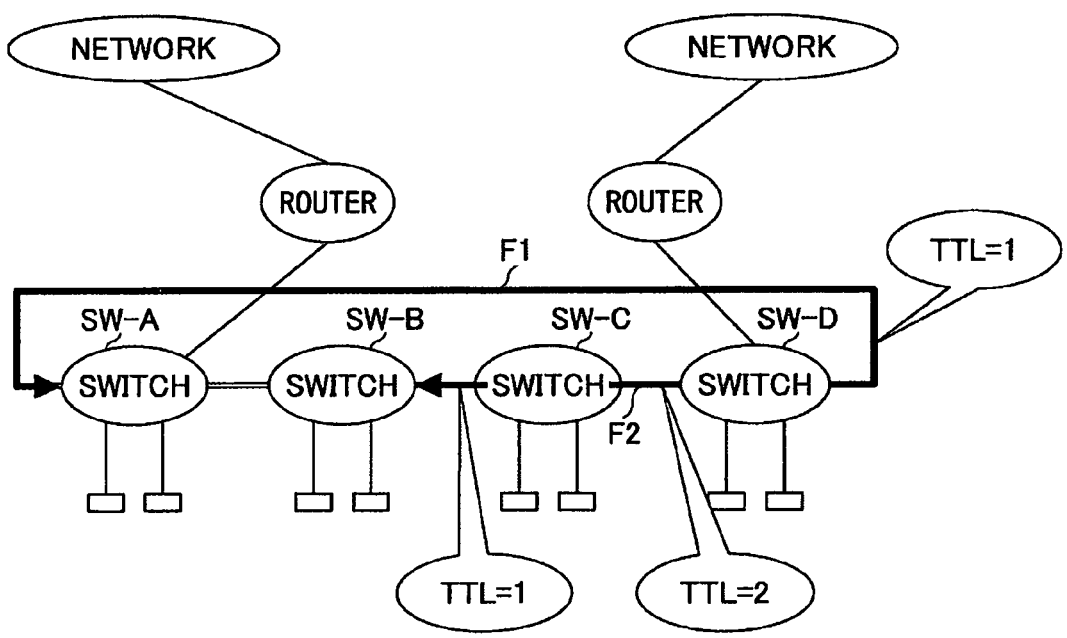
FIG. 3 is an illustration for explaining a control method by including TTL in a frame.
Figure 4:
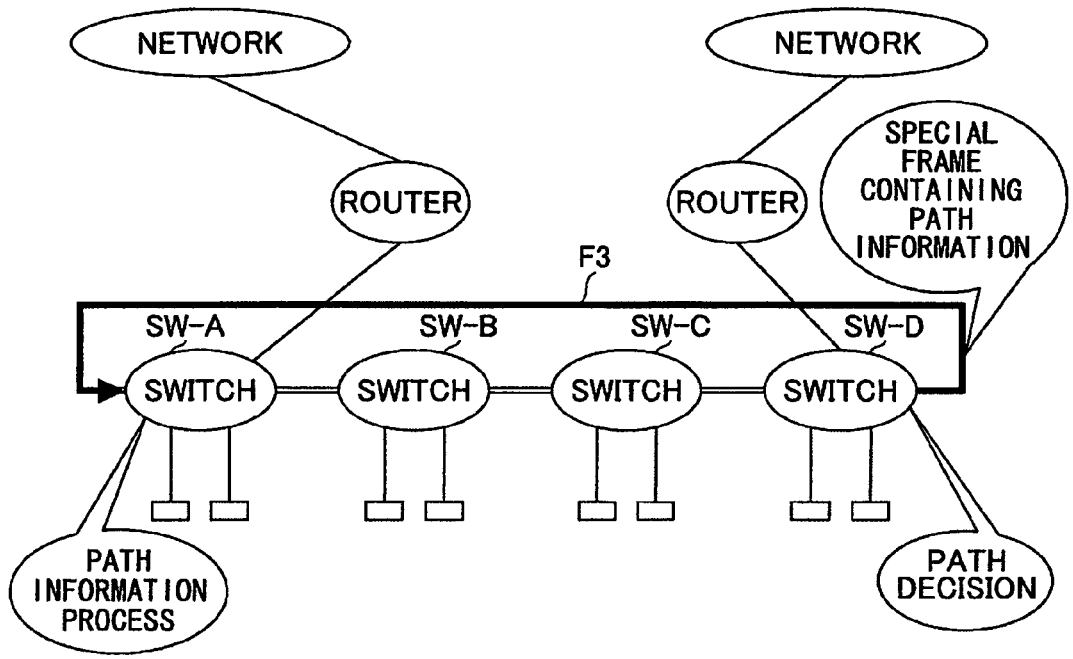
FIG. 4 is an illustration for explaining a method of deciding a path at a frame transferer.
Figure 5:
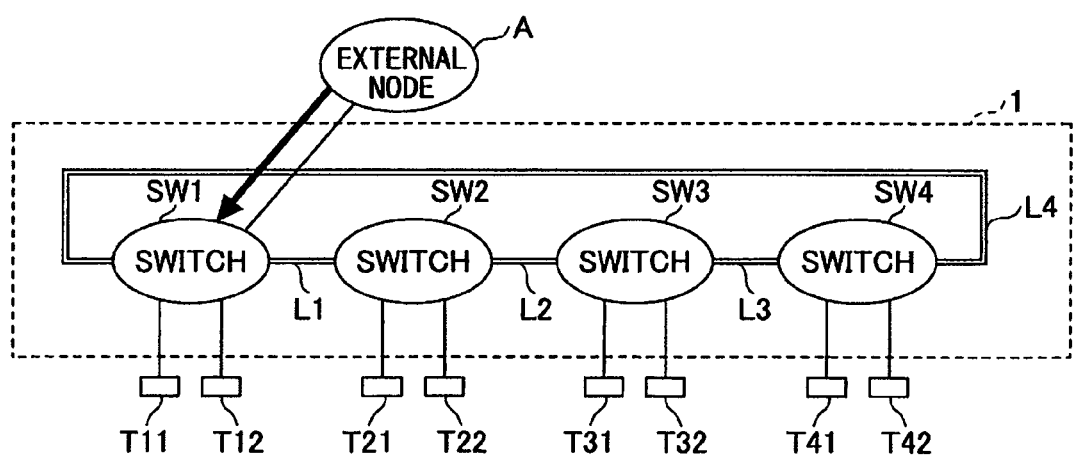
FIG. 5 is an illustration of a network structure according to one embodiment.

FIG. 5 is an illustration of a network structure according to one embodiment. In FIG. 5, a switch stack 1 includes switches SW1, SW2, SW3 and SW4 (hereinafter, referred to as "switch SW" when each switch is not distinguished from others). Each switch SW is a layer 2 switch (or may be referred to as "switching hub"), and is an example of a relay device to relay frames. Each switch SW is stack-connected with an adjacent switch in the figure. Hereinafter, a cable to connect between switches is referred to as "stack link". In FIG. 5, stack links L1 through L4 are illustrated. The stack link L4 is a redundant path for improving a network fault tolerance. Consequently, a loop is formed by the switches SW1 through SW4.

It is assumed that the switch SW3 is a master switch in the switch stack 1. As mentioned later, the master switch plays a roll to compute an optimum path in the switch stack 1 and notify other switches SW of a result of the computation. The optimum path is normally a path (shortest path) with which a hop count is minimized in the switch stack 1. It should be noted that a switch other than the master switch in the switch stack 1 is referred to as "slave switch". Accordingly, in the present embodiment, the switches SW1, SW2 and SW4 are slave switches.

An external node A is a network device (for example, a router) connected to the switch SW1, which is a sender of frames to the switch stack 1 in the present embodiment. Terminals such as personal computers (PCs) are connected to each switch SW. For example, terminals T11 and T12 are connected to the switch SW1.

Figure 6:
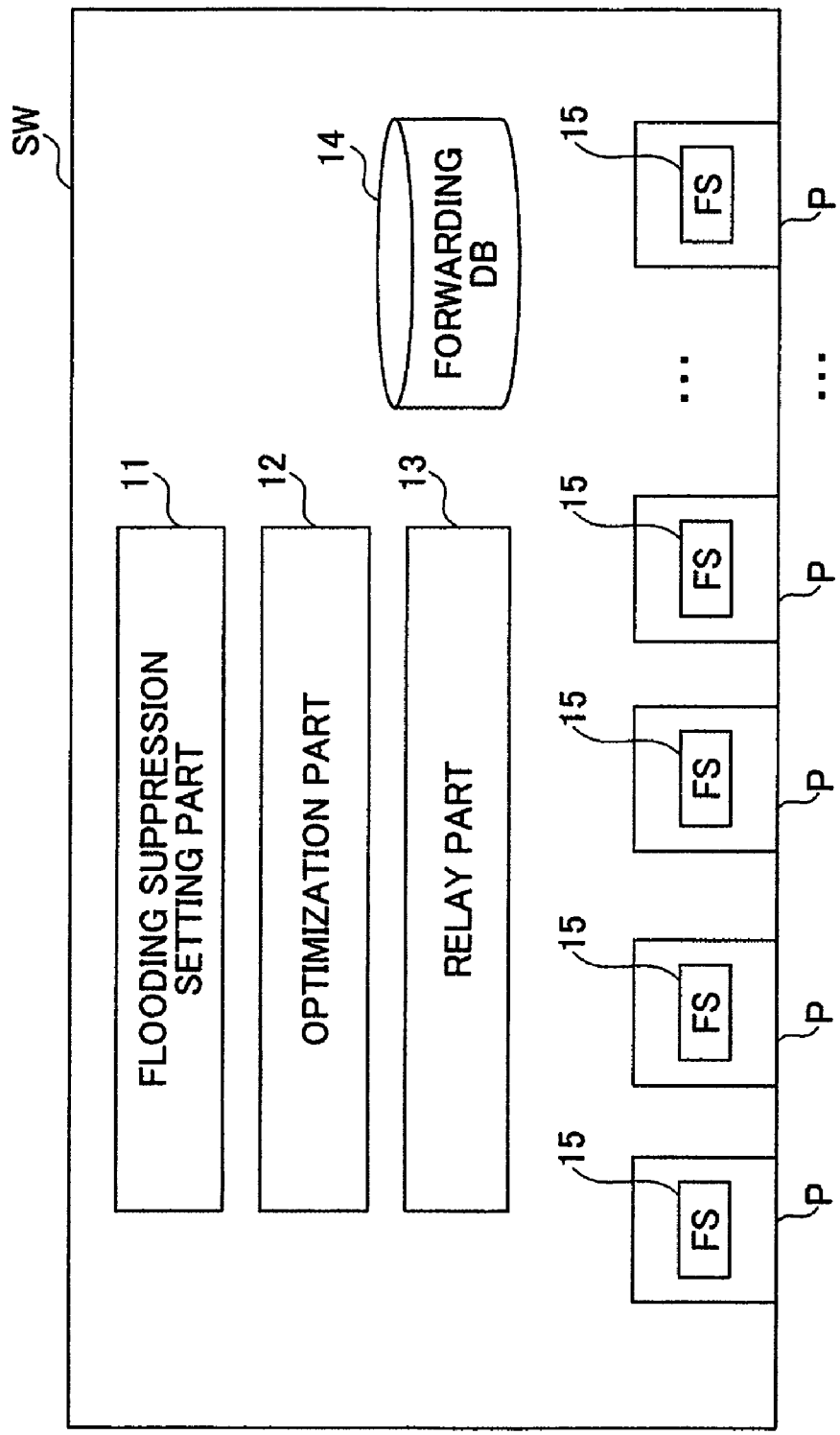
FIG. 6 is a block diagram of a switch according to the present embodiment.

FIG. 6 is a block diagram of a switch according to the present embodiment. In the present embodiment, each switch SW includes a flooding suppression setting part 11, an optimization part 12, a relay part 13, a forwarding DB 14, a plurality of ports P, etc.

The relay part 13 performs a relay of frames, which is a fundamental function of the switch SW. Specifically, the relay part 13 stores correspondence information in the forwarding DB 14 in response to reception of a frame. The correspondence information represents a correspondence relationship between a sender MAC address of the received frame and a port through which the frame is received. If the correspondence information is stored or registered in the forwarding DB 14, the relay part 13 causes the received frame to be sent through the port concerned. If the correspondence information is not stored in the forwarding DB 14, the relay part 13 performs flooding. Flooding is an operation to send a frame, which was received through one of ports, through all of the ports other than the port through which the frame was received. The flooding is performed because a port to which a destination node is connected is unknown in a case where a destination address of the received frame is not stored in the forwarding DB 14.

However, in the present embodiment, each port P has a flooding suppression part (FS) 15. The flooding suppression part 15 manages (retains) information representing whether a corresponding port P is in a flooding suppression state. For example, the flooding suppression part 15 is realized as a memory area of 1 bit in a memory provided in each port P. It is indicated that the port P concerned is in a flooding suppression state if a value of the bit of the flooding suppression part 15 is "1", which corresponds to ON. It is indicated that the port P concerned is not in a flooding suppression state if a value of the bit of the flooding suppression part 15 is "0", which corresponds to OFF. The relay part 13 causes the port P, which is in a flooding suppression state, (hereinafter, referred to as a flooding suppression port) to send a frame of which destination is a MAC address related to the port P concerned. That is, no frame is sent from the flooding suppression port when flooding is performed.

The flooding suppression setting part 11 sets ON/OFF of the flooding suppression part 15 of each of the ports P in accordance with instructions of setting or cancelling a flooding suppression state input to the flooding suppression setting part 11. The instructions to the flooding suppression setting part 11 may be input through a hardware interface (an operation button) such as a switch SW, or a frame containing a command designating an object to which a flooding suppression state is set may be input to the flooding suppression setting part 11.

The optimization part 12 performs a process for making a relay path of a frame to be optimum (shortest).

It should be noted that the relay part 13 is realized by a specific chip such as an ASIC. Because a high-speed processing is not required in comparison with the relay part 13, the flooding suppression setting part 11 and optimization part 12 can be realized by a CPU executing a program stored in a memory of the switch SW. However, the flooding suppression setting part 11 and the optimization part 12 may also be realized by a specific chip.

Figure 7:
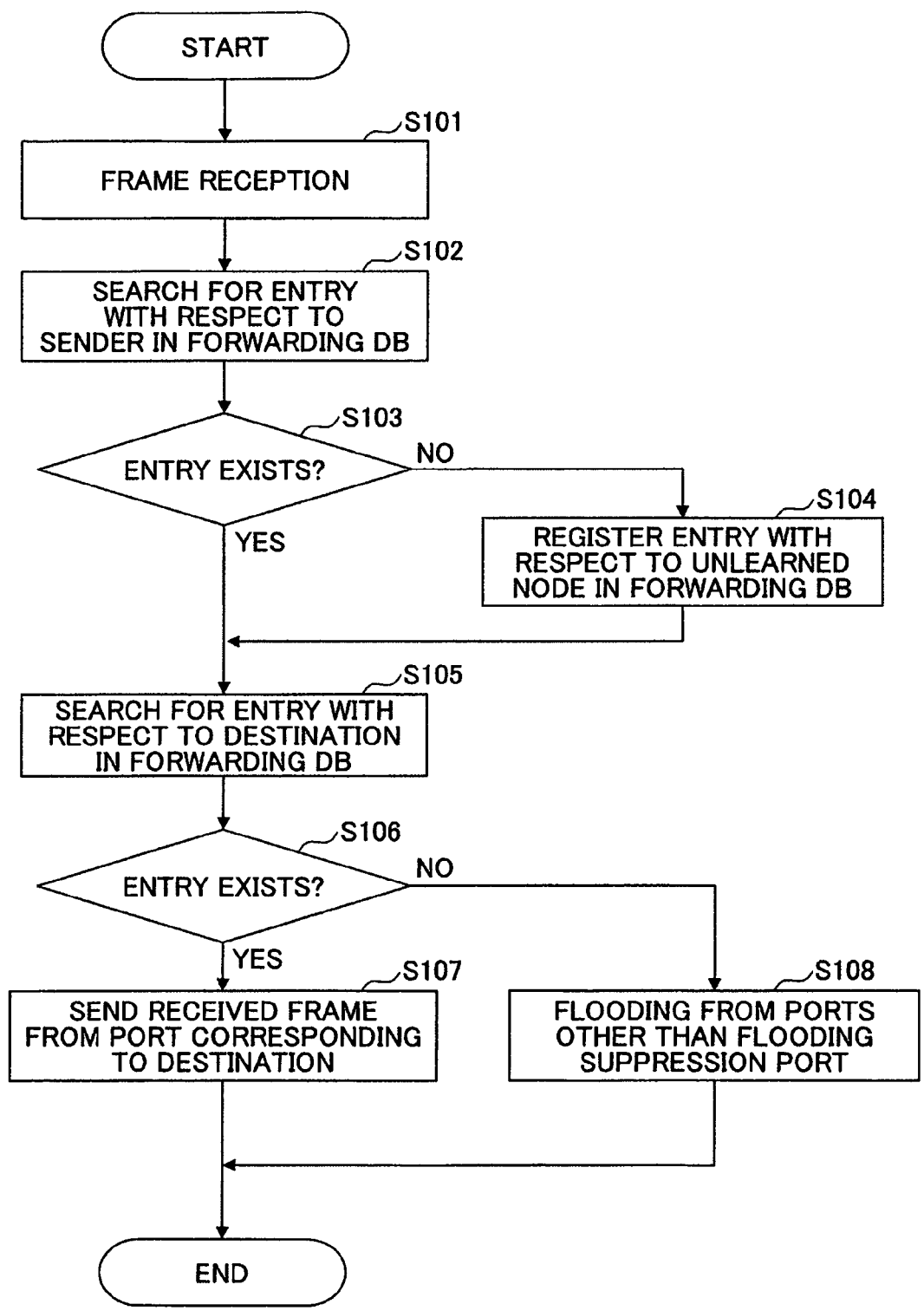
FIG. 7 is a flowchart for explaining an operation of a switch at a time of receiving a unicast frame.

A description will be given below of an operation of the switch SW. It is assumed that, as a first example, a unicast frame is an object to be transferred. FIG. 7 is a flowchart for explaining an operation of the switch at a time of receiving a unicast frame in the first example.

When a frame (unicast frame) is received at the switch SW (S101), the relay part 13 of the switch SW searches for an entry corresponding to the sender MAC address of the received frame in the forwarding DB 14 (S102). If a corresponding entry is not found (NO of S103), the relay part 13 registers an entry to an unknown MAC address (unlearned node) in the forwarding DB 14 (S104). Specifically, the correspondence information regarding a relationship between the MAC address concerned and the reception port is registered in the forwarding DB 14. Thereby, the unlearned node is changed to a learned node.

Then, the relay part 13 searches for an entry corresponding to the destination MAC address of the received frame in the forwarding DB 14 (S105). If the corresponding entry is found (YES of S106), the relay part 13 sends the received frame through the port P, which is related to the destination MAC address in the found entry (S107). If the corresponding entry is not found (NO of S106), the relay part 13 makes the received frame flood to ports P other than a flooding suppression port (S108).

According to the process of FIG. 7 being performed by each switch SW, a process illustrated in FIG. 8, for example, is performed as an entire switch stack 1.

FIGS. 8A through 8E are illustrations for explaining an operation of a switch stack when learning an unlearned node. In FIGS. 8A through 8E, the block signs B on the left side of the switch SW1 and the right side of the switch SW4 indicate positions of the flooding suppression ports. Specifically, the port P connected with the stack link L4 in the switch SW1 and the port P connected with the stack link L4 in the switch SW4 are the flooding suppression ports. That is, the ports P connected to opposite ends of the redundant path are set to the flooding suppression ports.

Figure 8A:
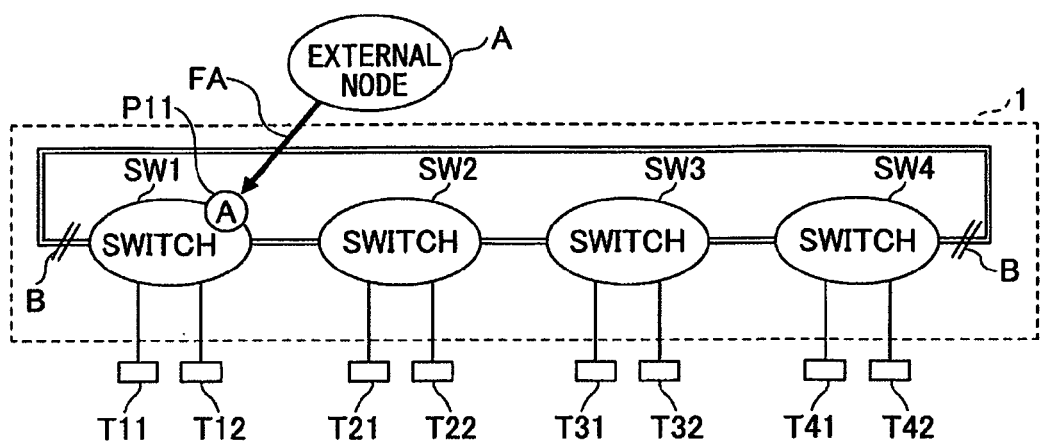
FIGS. 8A through 8E are illustrations for explaining an operation of a switch stack when learning an unlearned node.

As illustrates in FIG. 8A, when a frame FA is received from an external node A, which has not been learned, in the switch SW1, the relay part 13 of the switch SW1 registers correspondence information in the forwarding DB 14 of the switch SW1. The correspondence information represents a correspondence relationship between a sender MAC address of the frame FA and the reception port P11, which received the frame FA. In FIG. 8A, the sign A in a circle indicates that the correspondence information is registered in the forwarding DB 14.

Figure 8B:
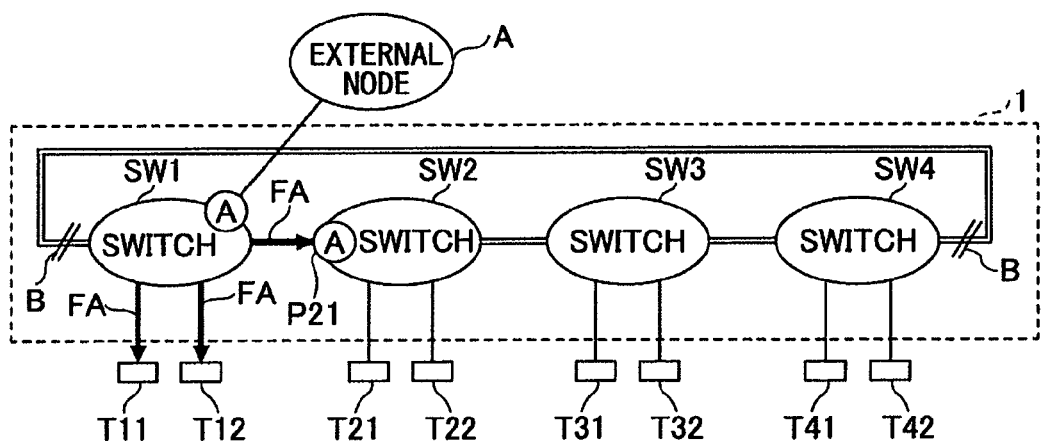

Then, as illustrated in FIG. 8B, the relay part 13 of the switch SW1 carries out the flooding of the received frame FA. The relay part 13 of the switch SW2, which received the frame FA, which was subjected to the flooding, registers correspondence information, which represents a correspondence relationship between the reception port P21 and the sender MAC address of the frame FA (the MAC address of the external node A), in the forwarding DB 14 of the switch SW2. However, the frame FA is not sent from the flooding suppression ports in the switch SW1. Therefore, the frame FA is not transferred from the switch SW1 to the switch SW4. Consequently, a storm of the frame FA is appropriately prevented in the switch stack 1.

Figure 8C:
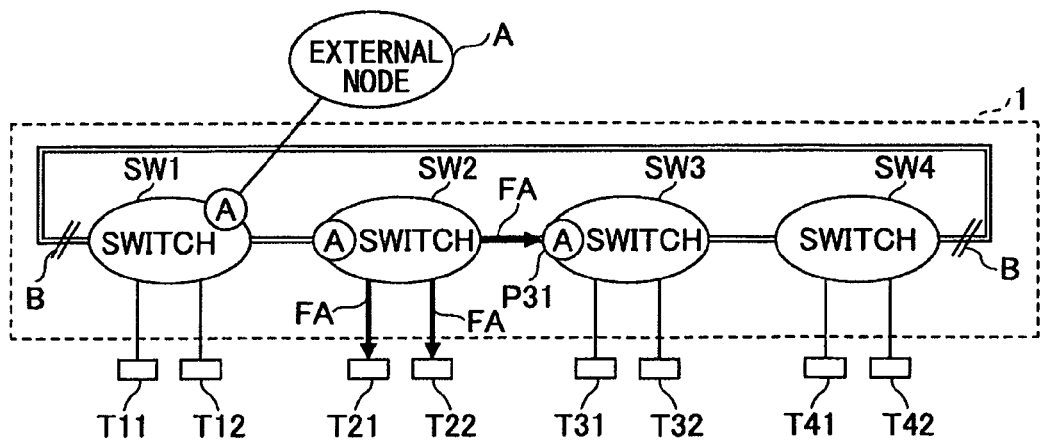

Then, as illustrated in FIG. 8C, the relay part 13 of the switch SW2 causes the received frame FA to flood. The relay part 13 of the switch SW3, which received the frame FA flooded by the switch SW2, registers correspondence information, which represents a correspondence relationship between the reception port P31 and the sender MAC address of the frame FA (the MAC address of the external node A), in the forwarding DB 14 of the switch SW3.

Figure 8D:
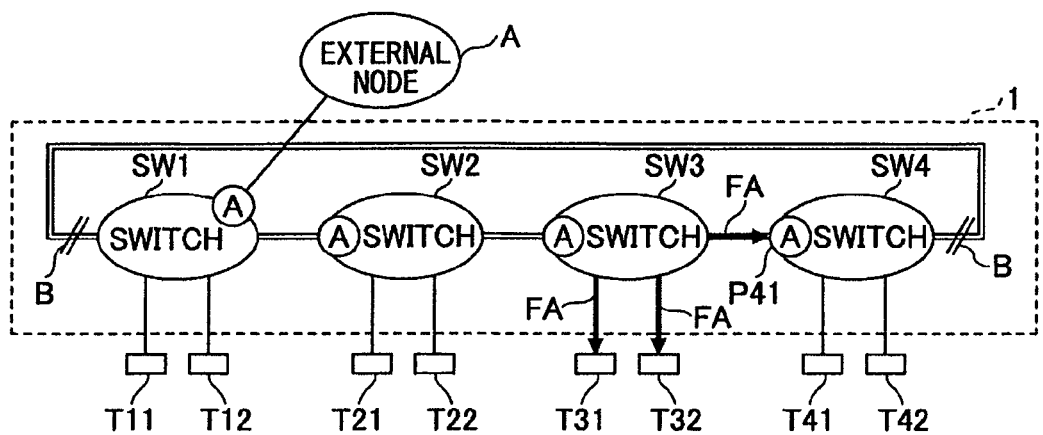

Then, as illustrated in FIG. 8D, the relay part 13 of the switch SW3 causes the received frame FA to be subjected to flooding. The relay part 13 of the switch SW4, which received the frame FA flooded by the switch SW3, registers correspondence information, which represents a correspondence relationship between the reception port P41 and the sender MAC address of the frame FA (the MAC address of the external node A), in the forwarding DB 14 of the switch SW4.

Figure 8E:
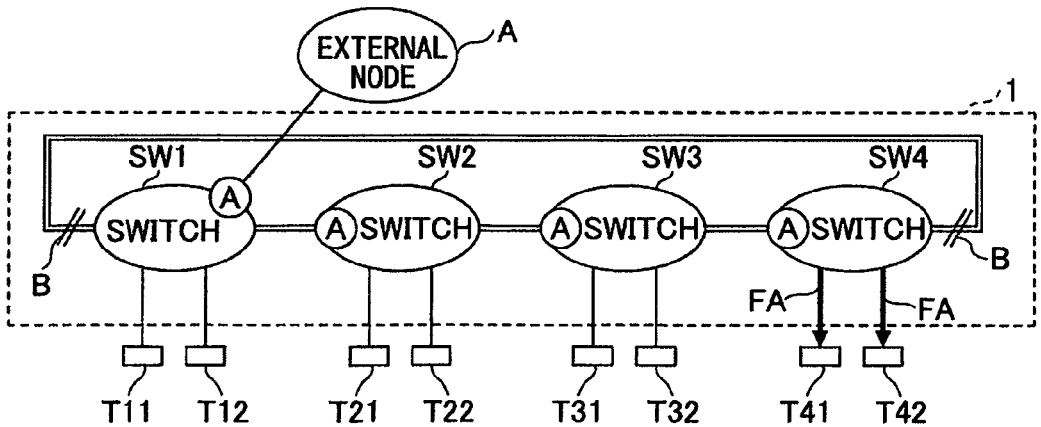

Then, as illustrated in FIG. 8E, the relay part 13 of the switch SW4 causes the received frame FA to flood. However, the frame FA is not sent to the flooding suppression port in the switch SW4. Therefore, the frame FA is not transferred from the switch SW4 to the switch SW1. Consequently, a storm of the frame FA is appropriately prevented in the switch stack 1.

Figure 9:
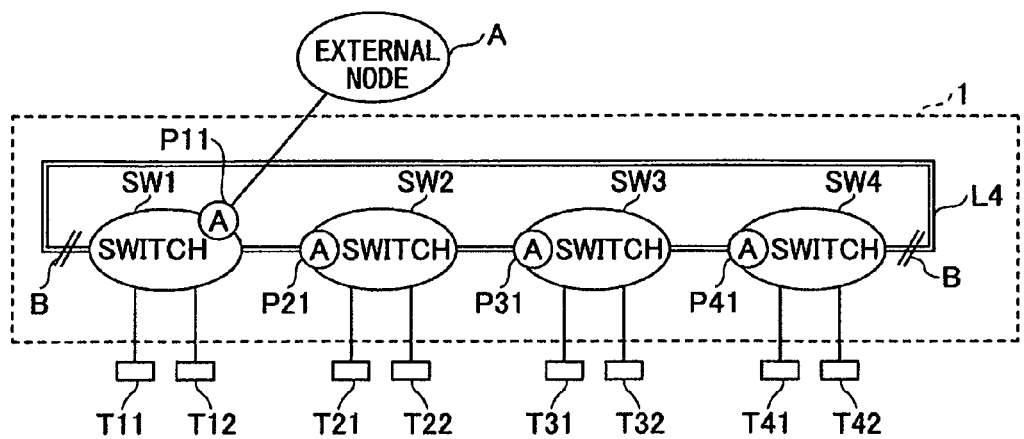
FIG. 9 is an illustration illustrating contents of a forwarding DB (database) after a learning process is performed.

As a result of the learning process illustrated in FIGS. 8A through 8E, information illustrated in FIG. 9 is registered in the forwarding DS 14 of each switch SW. FIG. 9 is an illustration illustrating contents of the forwarding DB 14 after the learning process is performed. As illustrated in FIG. 9, correspondence information, which represents a correspondence relationship between the port P11 and the MAC address of the external node A, is registered in the forwarding DB 14 of the switch SW1. Correspondence information, which represents a correspondence relationship between the port P21 and the MAC address of the external node A, is registered in the forwarding DB 14 of the switch SW2. Correspondence information, which represents a correspondence relationship between the port P31 and the MAC address of the external node A, is registered in the forwarding DB 14 of the switch SW3. Correspondence information, which represents a correspondence relationship between the port P41 and the MAC address of the external node A, is registered in the forwarding DB 14 of the switch SW4. A description will be given of a case where one of the switches SW1 through SW4 receives a frame addressed to the external node A.

Figure 10:
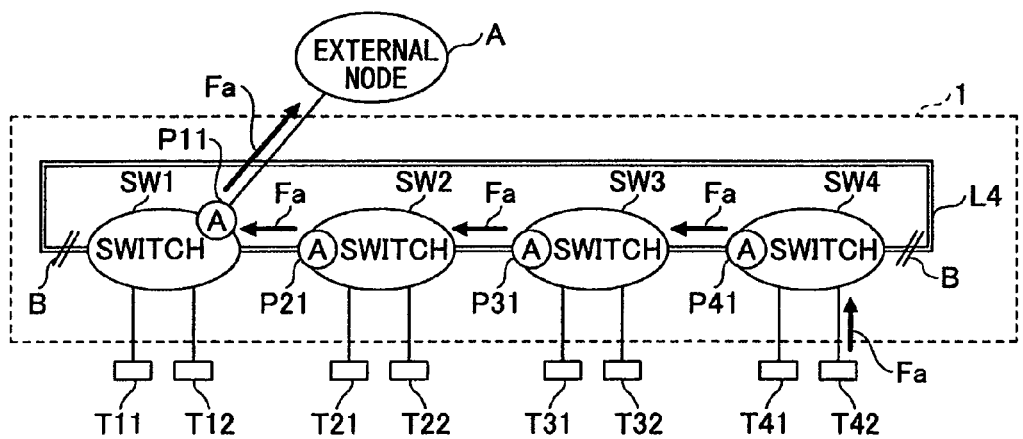
FIG. 10 is an illustration for explaining an operation when a frame addressed to an external node is received by a switch.

FIG. 10 is an illustration for explaining an operation when a frame addressed to the external node A is received by the switch SW4. In the example of FIG. 10, a frame Fa addressed to the external node A is sent from a terminal T42 to the switch SW4. In this case, the relay part 13 of the switch SW4 sends the frame Fa from the port P41 based on the forwarding DB 14. Thereafter, the frame Fa is transferred through the port P31 of the switch SW3, the port P21 of the switch SW2 and the port P11 of the switch SW1, and finally reaches the external node A.

In the path illustrated in FIG. 10, a hop count in the switch stack 1 is 3. On the other hand, if the stack link L4 is used, a hop count in the switch stack 1 is 1, thereby achieving a more efficient transfer of the frame Fa because the frame Fa is transferred directly from the switch SW4 to the switch SW1.

Thus, in the present embodiment, each switch SW received a frame, which was sent from a unlearned node (hereinafter, referred to as "unlearned node"), from outside the switch stack 1 performs a process illustrated in FIG. 11 in order to optimize the relay path. It should be noted that the process for optimization is performed concurrently with the process (learning process) illustrated in FIG. 8. That is, an illustration of the optimizing process is omitted in FIG. 8 for the sake of convenience of explanation.

Figure 11:
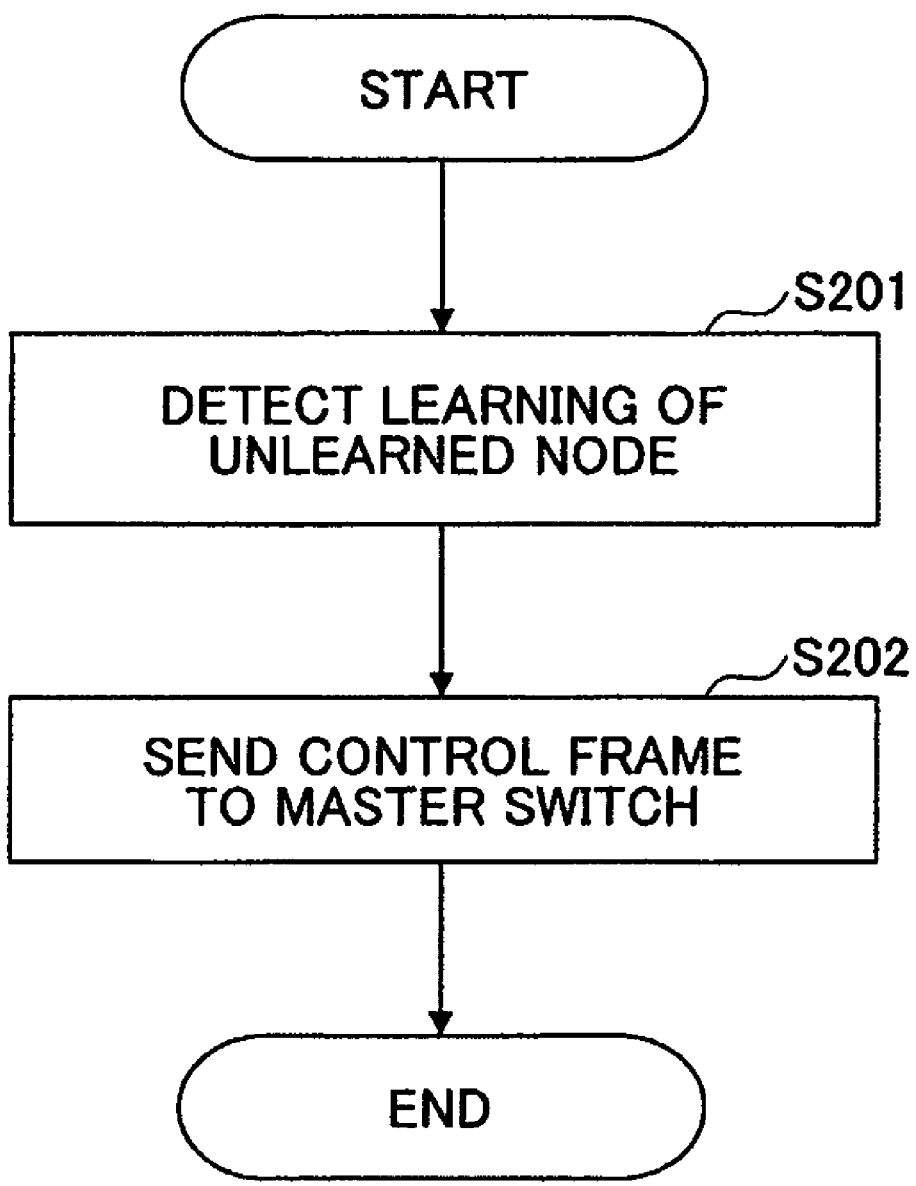
FIG. 11 is a flowchart for explaining a notification process of notifying an unlearned node to optimize a relay path.

FIG. 11 is a flowchart for explaining a notification process of notifying an unlearned node to optimize the relay path.

In step S201, the optimization part 12 of the switch SW detects learning of an unlearned node. A method of detecting an unlearned node by the optimization part 12 is not limited to a specific method. For example, the relay part 13 may sends a newly registered entry to the optimization part 12 after performing the process of step S104, and notifies the optimization part 12 of the learning of the unlearned node. In this case, the process of step S202 mentioned later is performed according to reception of an unlearned frame. Or the optimization part 12 may detect an addition of a new entry based on an unlearned frame by periodical polling to the forwarding DB 14. In such a case, the process of step S202 mentioned later is periodically performed.

Then, the optimization part 12 sends, in step S202, a control frame to the master switch (switch SW3), the correspondence information representing a correspondence relationship between a MAC address of a newly learned unlearned node (hereinafter, referred to as "new node") and a reception port which received the unlearned frame. Hereinafter, the control frame is referred to as "new node detection frame".

Figure 12A:
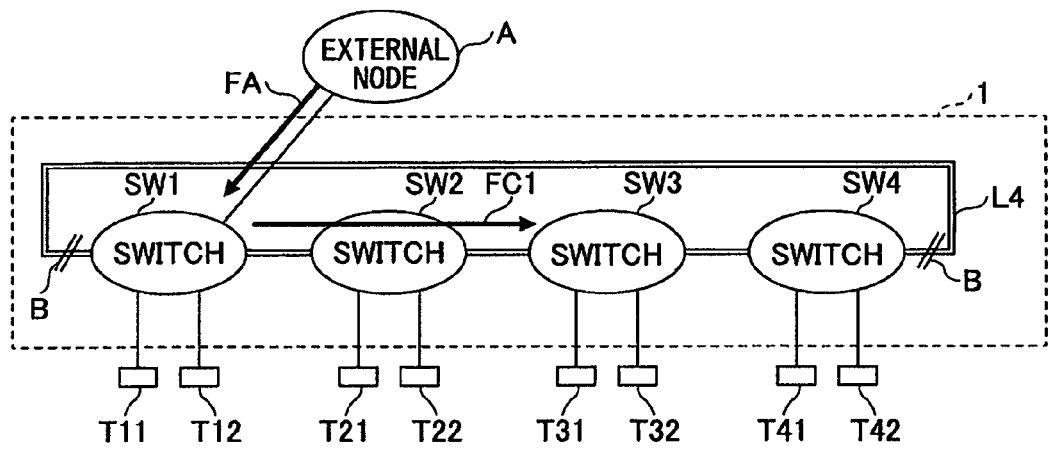
FIGS. 12A and 12B are illustrations for explaining an operation of the switch stack to optimize a relay path of a frame.
Figure 12B:
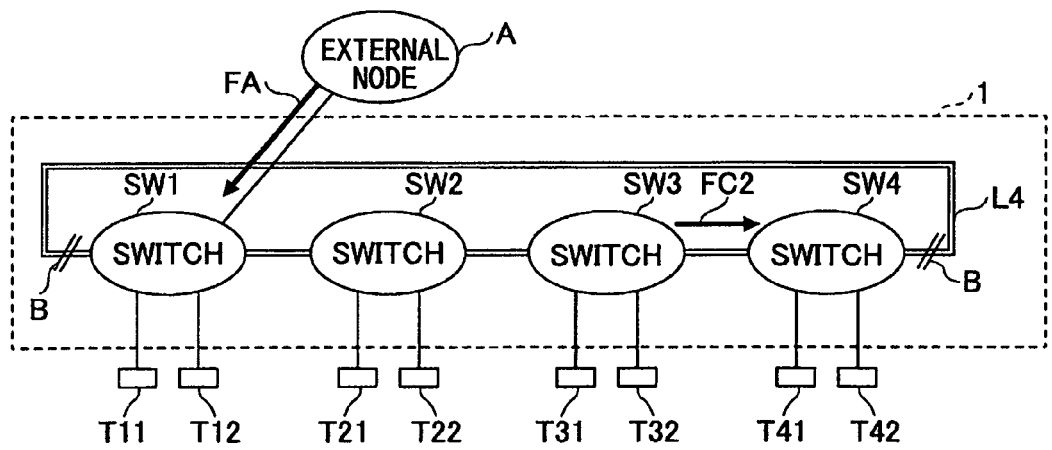

FIGS. 12A and 12B are illustrations for explaining an operation of the switch stack to optimize a relay path of a frame. FIG. 12A illustrates an example in which a new node detection frame F1 is sent from the switch SW1 to the switch SW3 based on the frame FA sent from the external node A. The process illustrated in FIG. 12A (that is, the process of step S202 of FIG. 11) is performed by each slave switch other than the switch SW1. That is, the optimization part 12 of each of the switches SW2 and SW4 sends the new node detection frame FC1 to the switch SW3 in response to the reception of the frame FA, which is flooded by the switches SW1 or SW3. It should be noted that information indicating whether the switch SW concerned is a master switch or a slave switch is stored in a memory of each switch SW. The optimization part 12 of each switch SW determines whether the switch SW concerned is a master switch or a slave switch based on the information stored in the memory of each switch SW.

A description will be given of a process performed by a master switch, which received the new node detection frame FC1.

Figure 13:
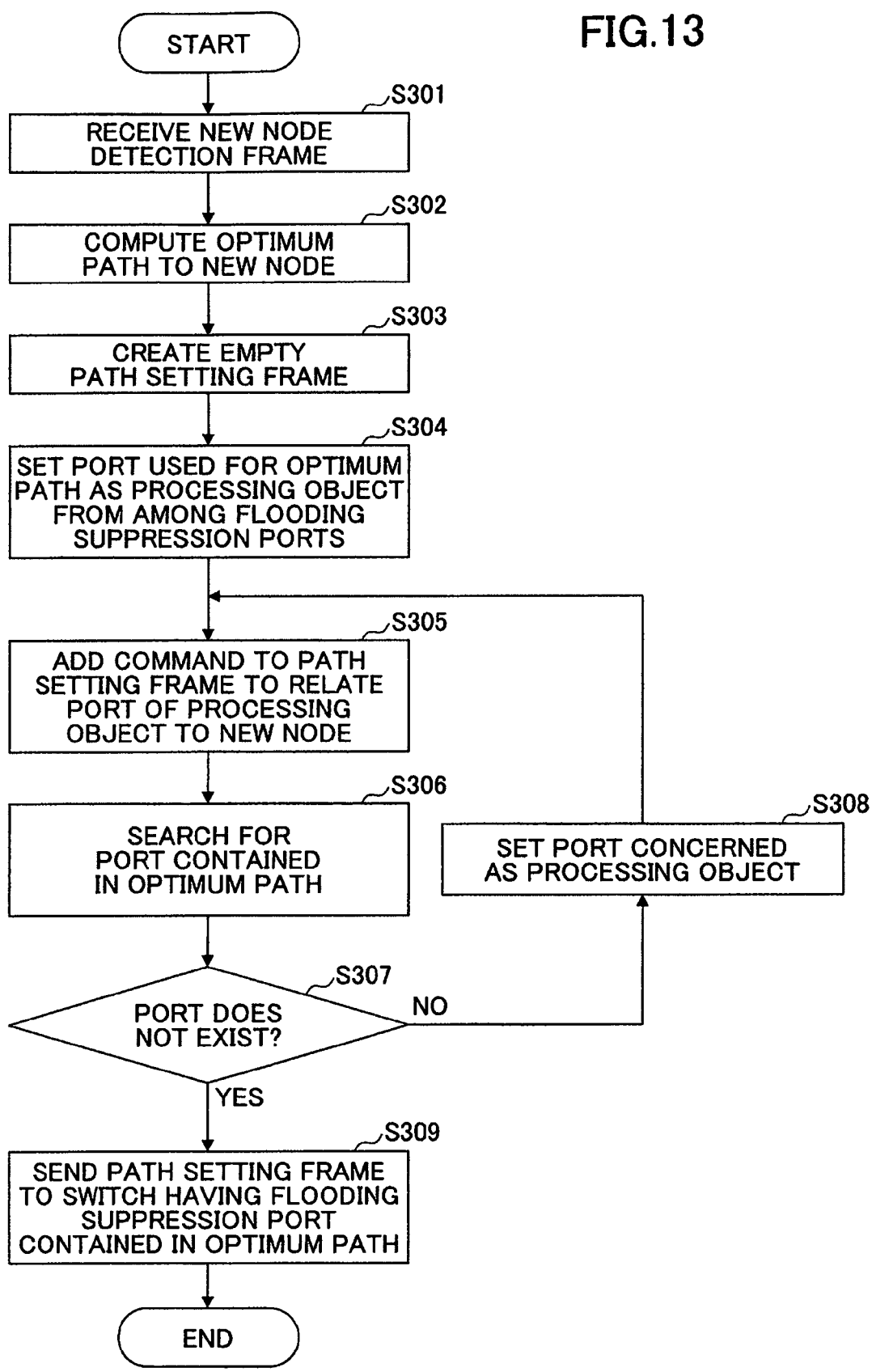
FIG. 13 is a flowchart for explaining a process performed by a master switch according to a new node detection frame received from a slave switch.

FIG. 13 is a flowchart for explaining the process performed by the master switch according to the new node detection frame received from a slave switch.

Upon reception of the new node detection frame, the relay part 13 of the master switch sends data contained in the new node detection frame to the optimization part 12 of the master switch (S301). The data contained in the new node detection frame contains correspondence information representing a correspondence relationship between a MAC address of the new node and a reception port. It should be noted that the process of step S301 is preformed each time the new node detection switch is received from each slave switch.

If a new node detection frame is received from all slave switches, the optimization part 12 performs the process after step S301. In other words, the optimization part 12 of the master switch holds an execution of step S302 until a new node detection frame is received from all slave switches. This waiting is done in order to prevent the optimization process from being executed prematurely prior to the learning process explained with reference to FIGS. 8A through 8E. That is, it is to prevent the optimized state being overwritten by the learning process. Accordingly, at the time of execution of the process of step S302, the contents of learning by each switch SW of the switch stack 1 are as illustrated in FIG. 9.

In step S302, the optimization part 12 computes (determines) an optimum path to the external node A for each switch SW based on data sent from the relay part 13 and topology information of the switch stack 1. The computation of the optimum path uses data contained in the new node detection frame, which is received from the switch SW (switch SW1) connected to the new node (external node A). It can be determined based on the topology information as to which switch is the switch SW connected to the new node. As a result of computation of the optimum path (optimum path information), information indicating a transmission port making a shortest path to the new node is output in each switch SW.

The topology information of the switch stack is information indicating a connection relationship of each switch SW contained in the switch stack 1. More specifically, the topology information is information indicating a port of each switch through which port the switch is connected to other switches. The topology information is previously determined or defined, and stored in a memory of the switch SW3, which is a master switch. The computation of the optimum path can be performed using a known technique. For example, a determination of an optimum path is made in the spanning tree protocol (STP), and the computation of the optimum path may be done by the same method as in the STP. It should be noted that the flooding suppression port may be included in the ports defining the optimum path according to the computation of the optimum path. That is, the flooding suppression port is not omitted from the ports defining the optimum path only for the reason that a port is a flooding suppression port. Rather, it is a purpose of the optimization to seek for an efficient path using a flooding suppression port.

Subsequently, the optimization part 12 creates an empty path setting frame (S303). The path setting frame is a control frame containing a command for causing a slave switch to perform setting of an optimum path to a new node. Then, the optimization part 12 sets a port, which is used as a transmission port in an optimum path from among flooding suppression ports in the switch stack 1, to be an object to be processed (S304). In the present embodiment, there are two flooding suppression ports. One is the port P of the switch SW1, and the other is the port P of the switch SW4. The flooding suppression port of the switch SW1 is not used as a transmission port in the optimum path. This is because the optimum path to the external node A in the switch SW1 is a reception port of the frame FA. On the other hand, the flooding suppression port of the switch SW4 is used as a transmission port in the optimum path. This is because a path from the switch SW4 to the external node A through the flooding suppression port of the switch SW1 is the shortest path. Accordingly, in the present embodiment, the flooding suppression port of the switch SW4 is set to an object to be processed.

Then, the optimization part 12 adds a command for making the port to be processed to correspond to the new node to the path setting frame (S305). The command for making the port to be processed to correspond to the new node is a command containing an instruction to the switch SW having the port concerned to set the port concerned as a port corresponding to the new node.

Figure 14:
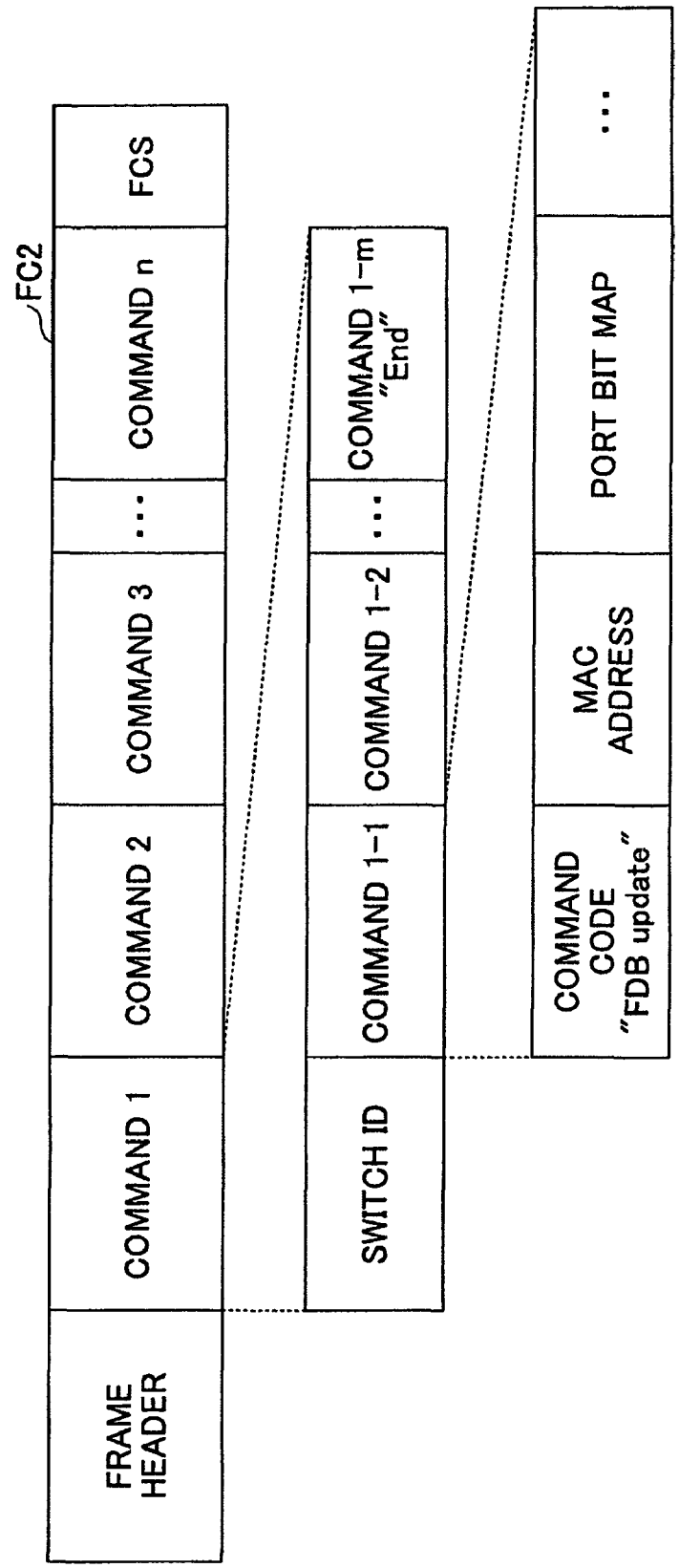
FIG. 14 is an illustration illustrating a structure of a path setting frame.

FIG. 14 is an illustration illustrating a structure of the path setting frame. In the path setting frame FC2 of FIG. 14, one of the command 1 through command n following a frame header is the command added in the step S305. One command corresponds to one command and contains a switch ID and one or more sub-commands (including a command 1-1 through a command 1-*m* illustrated in FIG. 14). The switch ID is an identifier of the switch SW corresponding to the command concerned. For example, the switch ID is a MAC address of the switch SW concerned. Each sub-command contains a command code, a MAC address, a port bit map, etc. The sub-command at the end contains a sign indicating an end (in FIG. 14, indicated by "End"). The command code is information indicating a type of command. "FDB update" illustrated in FIG. 14 indicates an update of the forwarding DB 14. The MAC address is an object to be updated. The port bit map is a bit sequence indicating the port P set as an object to be updated. For example, if the switch SW has 32 ports P, the port bit map is a bit sequence of 32 bits, and a bit corresponding to the port P to be updated is set to 1. A plurality of sub-commands can be designated for one switch SW in order to make it possible to instruct to update the forwarding DB 14 for a plurality of ports P at the same time.

In the present embodiment, at the first step S305, the switch ID is an identifier with respect to the switch SW4, and a command 1, which contains the MAC address of the new node (external node A) and the port P of the object to be processed, is added to a path setting frame FC2.

Then, the optimization part 12 searches for a port, which is a port of a different switch SW connected to the switch SW having a port of the object to be processed and contained in the optimum path, in the optimum path information (S306). Here, the port of the switch SW3, which is connected to the switch SW4, is searched. With respect the switch SW3, a distance (hop count) of a path by way of the switch SW4 is equal to a distance of a path by way of the switch SW2. In the present embodiment, it is assumed for the sake of convenience of explanation that the path by way of the switch SW4 is used in the process of step S302 as an optimum path from the switch SW3 to the external node A. Accordingly, in step S306, the port connected to the switch SW4 is searched in the switch SW3.

If the port concerned is found (NO of S307), the optimization part 12 newly sets the port concerned to be an object to be processed (S308), and repeats the process of steps S305 to S307. Therefore, a command for making a port of a new object to be processed to correspond to the new node is further added to the path setting frame FC (S305). However, in the subsequent step S306, the port, which is a port of another switch SW connected to the switch SW3 and contained in the optimum path, is not found because the optimum path from the switch SW2 to the external node A is by way of the switch SW1. Therefore, in step S307, it is determined that there is no port concerned. Then, the optimization part 12 sends the path setting frame FC2 to the switch SW having the flooding suppression port contained in the optimum path (S309). Here, "the switch SW having the flooding suppression port contained in the optimum path" is the switch SW having the port set to an object to be processed first in step S304. Accordingly, in the present embodiment, the path setting frame FC2 in which the MAC address of the switch SW4 is stored in the destination MAC address is sent. FIG. 12B illustrates sending the path setting frame FC2 from the switch SW3 as a master switch to the switch SW4.

Figure 15:
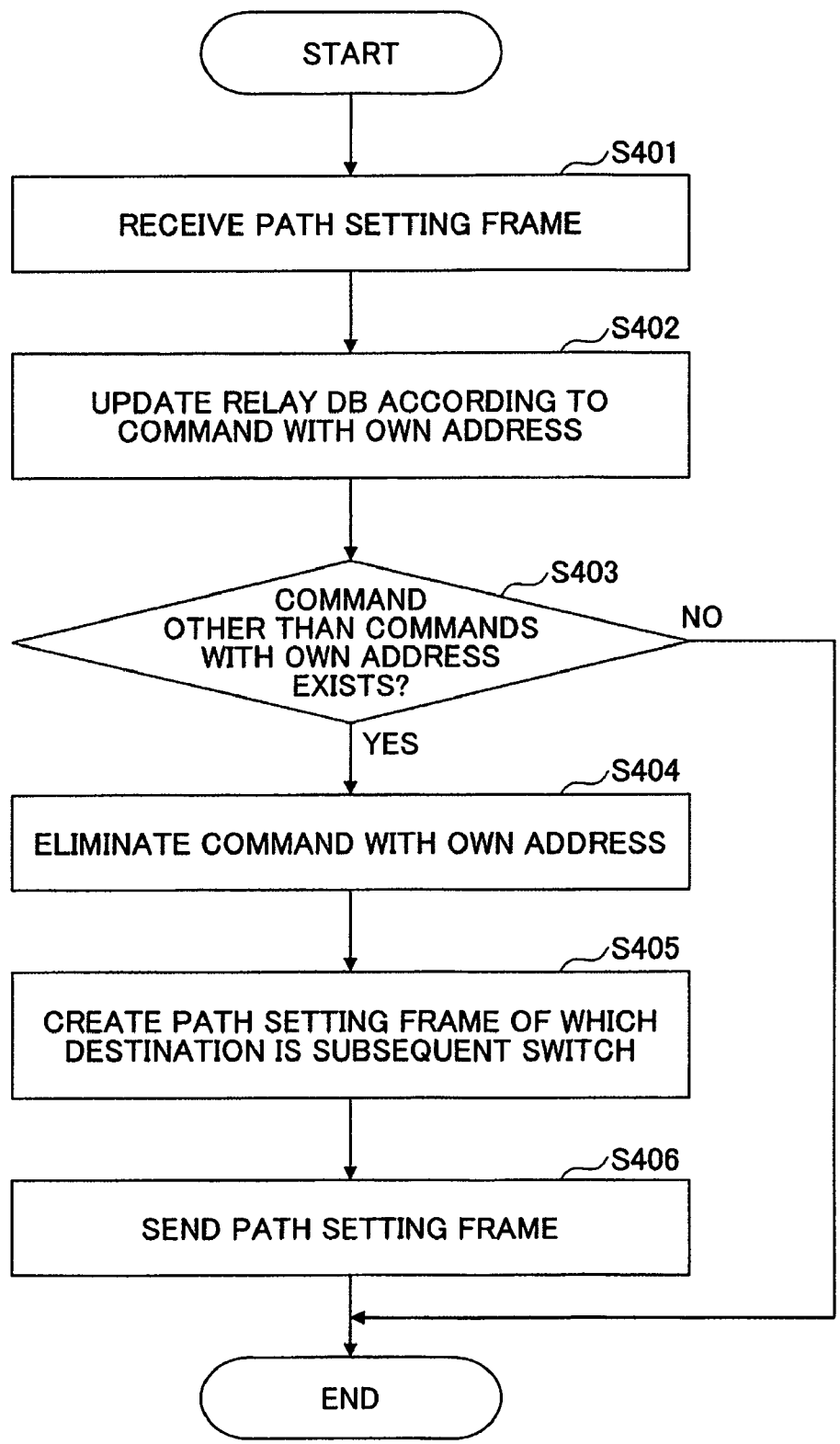
FIG. 15 is a flowchart for explaining a process performed according to the path setting frame.

A description will be given of a process procedure performed in a switch, which received the path setting frame FC2. FIG. 15 is a flowchart for explaining a process performed according to the path setting frame. It should be noted that, in the present embodiment, the path setting frame FC2 is processed first by the switch SW4. Thus, the flowchart of FIG. 15 will be explained as a process of the switch SW4.

Upon receipt of the path setting frame FC2 of which destination MAC address is the MAC address of the switch SW4, the relay part 13 of the switch SW4 outputs the path setting frame FC2 to the optimization part 12 (step S401). The optimization part 12 extracts the command with respect to the switch SW4 from the path setting frame FC2, and updates the forwarding DB 14 of the switch SW4 based on the extracted command (S402). The determination as to whether the command is to the switch SW4 is made based on the switch ID contained in the command.

Figure 16A:
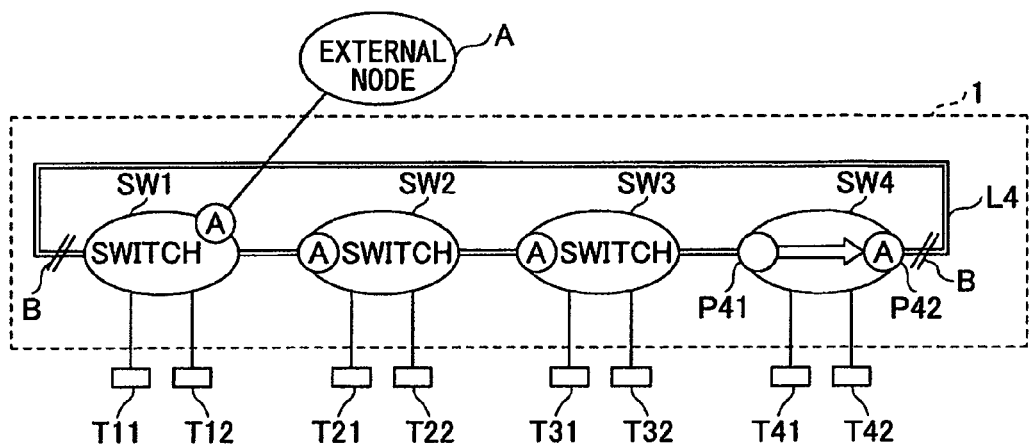
FIGS. 16A and 16B are illustrations for explaining an updating process of a forwarding DB based on a path setting frame.
Figure 16B:
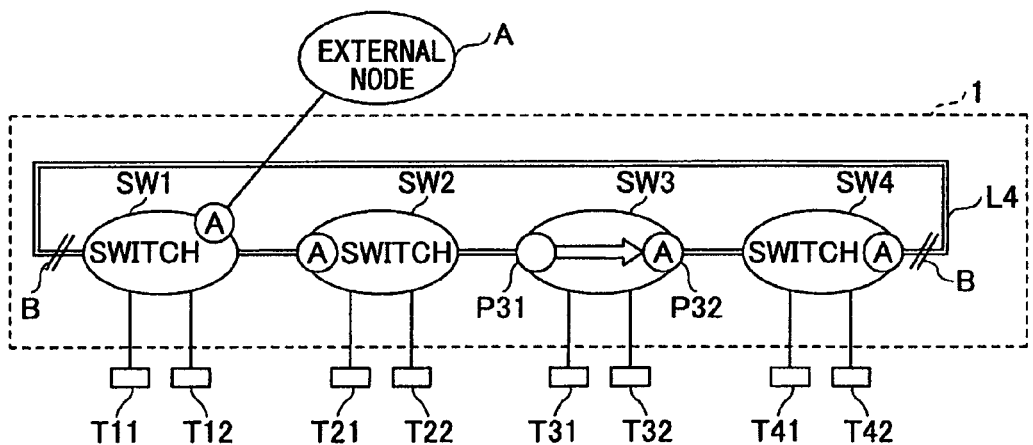

FIGS. 16A and 16B are illustrations for explaining the updating process of the forwarding DB based on the path setting frame. As illustrated in FIG. 16A, the optimization part 12 of the switch SW4 changes the port P corresponding to the MAC address of the external node A in the forwarding DB 14 from a port P41 into a port P42 based on the command of the path setting frame FC2. As a result, the frame Fa addressed to the external node A received by the switch SW4 is sent to the link L4 and reaches the external node A by way of the switch SW1.

Figure 17:
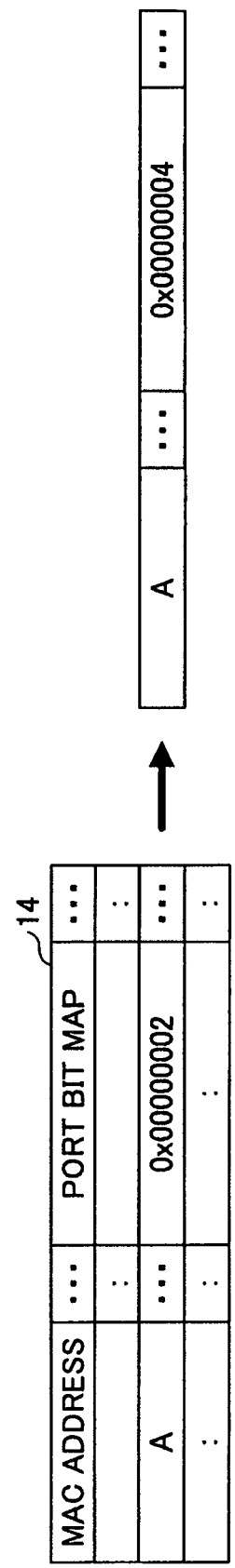
FIG. 17 is an illustration of an example of updating the forwarding DB.

FIG. 17 is an illustration of an example of updating the forwarding DB. In the forwarding DB of FIG. 17, the MAC address of the external node is illustrated as "A" for the sake of convenience. FIG. 17 illustrates an example in which the port bit map "0x00000002" corresponding to the MAC address "A" is updated to "0x00000004". It should be noted that "0x00000002" is a port bit map indicating the port P41, and "0x00000004" is a port bit map indicating the port P42.

Returning to FIG. 15, the optimization part 12 determines whether a command other than the command to the switch SW4 is contained in the path setting frame FC2 (S403). In the present embodiment, a command to the switch SW3 is contained in the path setting frame FC2. Accordingly, the process proceeds to step S404. In step S404, the optimization part 12 of the switch SW4 removes the command to the switch SW4 from the command path setting frame FC2 (S404). Then, the optimization part 12 set the destination MAC address of the path setting frame FC to the MAC address of the switch SW relating to the switch ID contained in a first command in the alignment sequence of commands (S405). Therefore, the switch SW3 is set as a destination. Then, the optimization part 12 sends the path setting frame FC2 to the switch SW3 (S406).

When the path setting frame FC2 sent from the switch SW4 is received by the switch SW3, the process illustrated in FIG. 15 is performed by the switch SW3. As a result, the forwarding DB 14 of the switch SW3 is updated as illustrated in FIG. 16B. That is, the port P to the external node A is changed from a port P31 into a port P32. As a result, the frame Fa addressed to the external node A received by the switch SW3 is sent to the external node A by way of the switches SW4 and SW1. In the present embodiment, the path setting frame FC2 is not sent to the switches SW1 nor SW2, and the forwarding DB is not updated. This is because the path for the switches SW1 and SW2 at the time of learning is already an optimum path.

According to the process of FIG. 13, a command to the switch SW having the port concerned is added to the path setting frame FC2 sequentially from the port closer to the flooding suppression port. Additionally, according to the process of FIG. 15, the path setting frame FC2 is transmitted in the alignment sequence of commands in the pass setting frame FC2.

Consequently, as illustrated in FIGS. 16A and 16B, in the present embodiment, the update of the forwarding DB 14 is first performed in the switch SW having a flooding suppression port. Thereafter, the update of the forwarding DB 14 is performed in an order of the switch SW closer to the flooding suppression port. This is to appropriately perform the relay of the frame Fa even in the process of updating the forwarding DB 14 in each switch SW based on the path setting frame FC2. That is, if the forwarding DB 14 of the switch SW3 is updated first, the destination of the frame Fa addressed to the external node is set to the other side both in the switches SW3 and SW4, which results in that the frame Fa is not transferred correctly when the frame Fa is received by the switch SW3 or SW4.

In the above-mentioned example, commands to a plurality of switches SW are contained in one path setting frame FC2 and the path setting frame FC2 is transmitted to the plurality of switches SW. However, only a command to one switch SW may be contained in one path setting frame FC2. In such a case, the master switch merely sends the path setting frame FC2 to each switch SW requiring an update of the forwarding DB 14. However, in such a condition, the master switch is required to control a sending order and a sending timing of each path setting frame FC2 so that the forwarding DB 14 of the switch SW closer to the flooding suppression port is updated earlier. Accordingly, for example, a complex control is required to cause each switch SW to announce a completion of updating of the forwarding DB 14 and send the path setting frame FC2 with respect to a next switch SW after reception of the announcement. On the other hand, the method of sequentially transmitting one path setting frame FC2 explained in the present embodiment is superior to such a method in that such a complex control is not required.

As mentioned above, according to the switch SW of the first embodiment, a frame storm due to flooding can be suppressed by the flooding suppression port. Because the flooding suppression port is used to send an already-learned frame, a stack link connected to the flooding suppression port can be used effectively. Accordingly, an increase in a hop count of a frame and a congestion of a stack link can be suppressed appropriately.

Moreover, according to the switch stack 1 of the first embodiment, an optimization of the relay path is performed by a control performed by a master switch. In the optimization, the flooding suppression port is set to an object to be used. As a result, the relay path to the newly learned external node can be more efficient.

Moreover, any special information is not added to the frame (for example, the frame A) for transferring normal data. That is, a control frame is used for the optimization process, and the frame for transferring normal data is not used. Accordingly, an amount of hardware to be added to each switch SW to process a special frame can be reduced.

It should be noted that it is not required for all switches SW in the switch stack 1 to have the flooding suppression setting part 11 and the flooding suppression part 15. In the present embodiment, only the switches SW1 and SW4 are necessarily provided with the flooding suppression setting part 11 and the flooding suppression part 15. That is, only the switches SW connected to the redundant path are required to have the flooding suppression setting part 11 and the flooding suppression part 15.

Although the switch stack 1 has been explained as an example in the present embodiment, the present embodiment is not limited to the stack connected switch. The present embodiment is applicable to a network system in which switches are connected to form a loop.

The network topology is not limited to the ring topology. The present embodiment is applicable also to a case where a loop is formed in other topologies.

A description will be given below of a second embodiment. In the second embodiment, a multicast frame is set to an object to be transferred. First, a description will be given of IGMP (Internet Group Management Protocol) snooping, which is a technique used in the second embodiment.

FIGS. 18A and 18B are illustrations for explaining the IGMP snooping. As illustrated in FIG. 18A-(a), in the IGMP, first a router, which transmits a multicast, sends a query message Q to inquire members of a specific multicast group. The query message Q is relayed by a switch and is flooded at each port.

As illustrated in FIG. 18A-(b), nodes n1 and n3, which are the members of the multicast group from among the nodes n1 through n3 that received the flooded query message, return membership reports. The first one of the membership reports is referred to as a join message. Upon receipt of the join message, the switch snoops an IP packet of the join message when relaying the join message to the router in order to detect a port in which a specific member of the multicast group exists.

Then, as illustrated in FIG. 18A-(c), the switch resisters correspondence information in the forwarding DB 14, the correspondence information representing a correspondence relationship between a MAC address corresponding to the multicast group and the port in which the member exists. The MAC address corresponding to the multicast group is contained as a destination MAC address of the frame containing the query message or the join message.

Then, when the multicast frame is sent from the router as illustrated in FIG. 18B, the switch sends the multicast frame from the port registered by the IGMP snooping. Therefore, no frame is relayed to the node n2, which is not a member of the multicast group concerned. Consequently, in the multicast, an unnecessary frame transfer due to flooding is suppressed. This is a purpose of the IGMP snooping.

In the second embodiment, the multicast using the above-mentioned IGMP snooping is performed through the switch stack 1. For the sake of convenience, it is supposed that the network structure and the structure of the switch stack 1 are the same as that of the first embodiment (FIG. 5). Additionally, it is supposed that the position of the flooding suppression port in the switch stack 1 is the same as that of the first embodiment.

Figure 19:
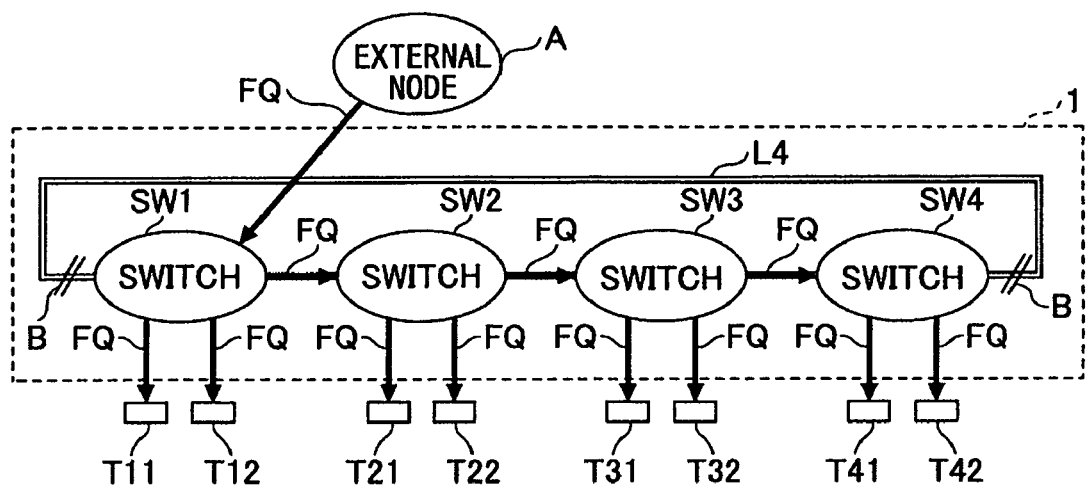
FIG. 19 is an illustration for explaining an operation of a switch stack when a query massage is received in a second embodiment.

FIG. 19 is an illustration for explaining an operation of the switch stack when a query massage is received in the second embodiment.

In FIG. 19, a transmission path of a frame FQ is illustrated when the frame FQ, which contains a query message sent from the external node A, is received by the switch SW1. The flooding of the frame FQ is carried out in an order of the switch SW1→the switch SW2→the switch SW3→the switch SW4, and is notified the T connected to each switch SW. However, the frame FQ is not sent from the flooding suppression ports of the switches SW1 and SW4. Accordingly, the flow of the frame FQ is suppressed in the stack link L4. As a result, a storm of the frame FQ is appropriately prevented in the switch stack 1.

The optimization part 12 of the switch SW1, which received the frame FQ from the external node A, sends a new node detection frame FC1 to the master switch (switch SW3) the same as in the first embodiment. The optimization part 12 of the switch SW3 computes an optimum path from each switch SW to the external node A, which is an issuer of the frame FQ (query message), based on the new node detection frame FC1 and the topology information of the switch stack 1. The optimization part 12 stores the optimum path information as a result of the computation in a memory of the master switch by relating to a MAC address (a destination MAC address of the frame containing the query message) corresponding to the multicast group associating the query message. However, in the second embodiment, the master switch does not send the path setting frame FC2 based on the result of computation of the optimum path to slave switches. Accordingly, the forwarding DB 14 of each switch SW is not updated at the stage of issuing the query message.

Figure 20:
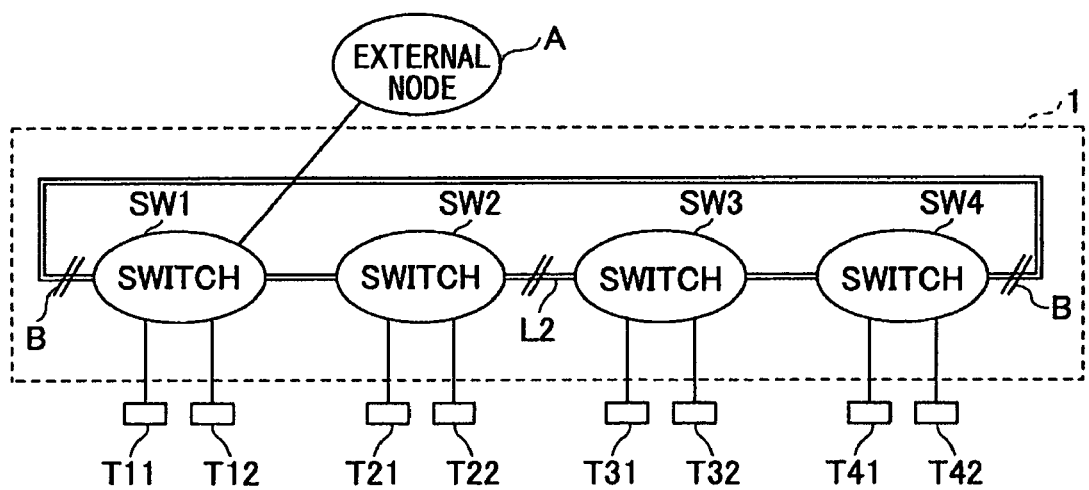
FIG. 20 is an illustration illustrating a stack link, which is not used in a relay of a multicast frame.

Also in the second embodiment, the optimal path information to the external node A is as illustrated in FIG. 16B. Thus, the stack link L2 is not used in the relay of the multicast frame as illustrated in FIG. 20.

Figure 21A:
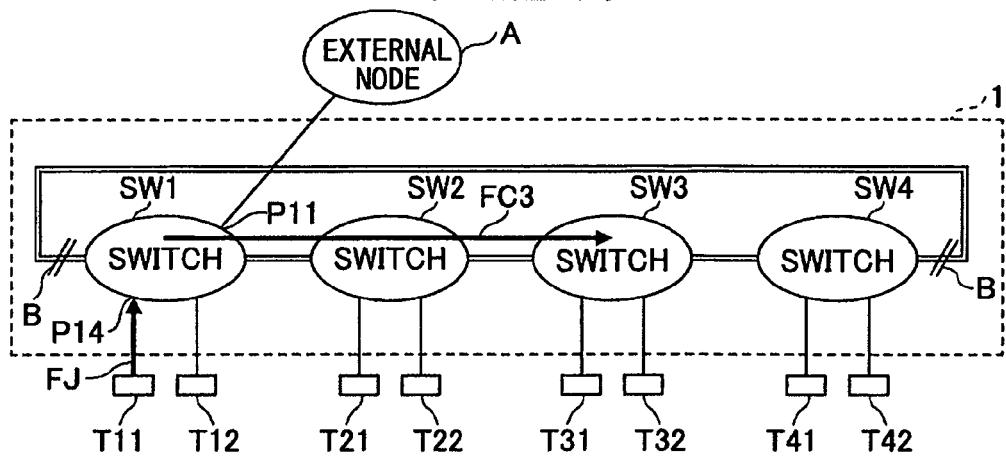
FIGS. 21A, 21B and 21C are illustrations for explaining an operation of a switch stack when a join message is received in the second embodiment.
Figure 21B:
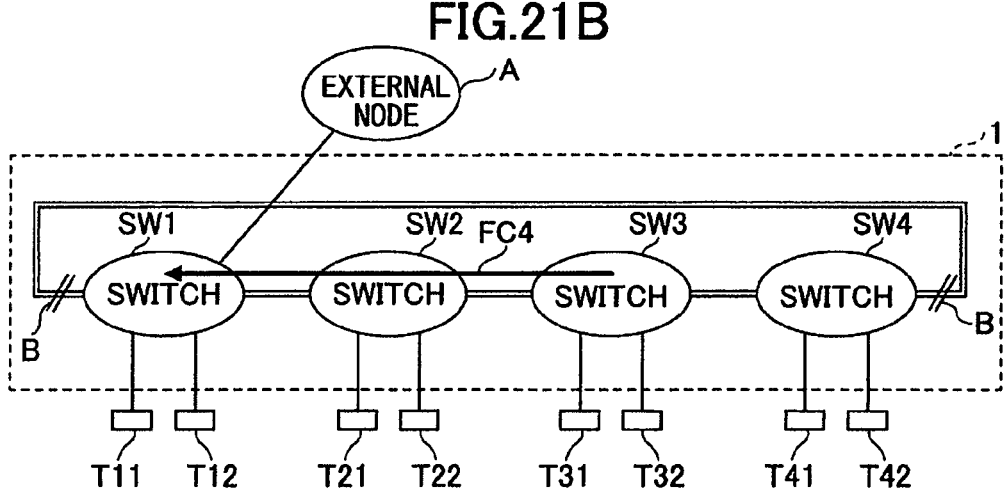
Figure 21C:
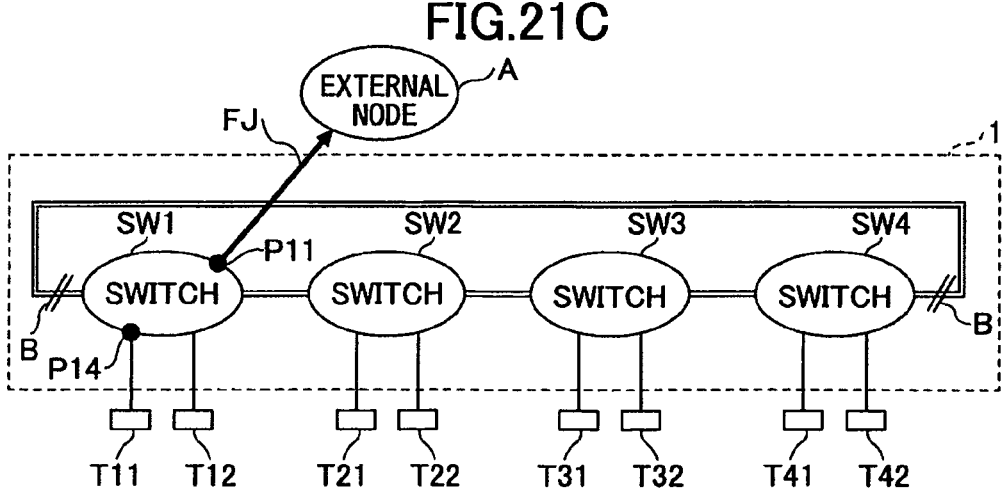

A description will be given below of an operation of the switch stack when each switch SW received the join message. FIGS. 21A, 21B and 21C are illustrations for explaining an operation of the switch stack when the join message is received in the second embodiment.

FIG. 21A illustrates an example in which the relay part 13 of the switch SW1 received a frame FJ containing a join message from the terminal T11. In this case, the optimization part 12 of the switch SW1 traps the join message, and sends a control frame FC3 to the master switch (switch SW3). The control frame FC3 contains the join message concerned and an identifier of the reception port (port P14) of the frame FJ. The optimization part 12 of the switch SW3 searches for the optimal path in the optimum path information. The optimum path is from the reception port of the frame FJ in the switch SW1 to the external node A, which is an issuer of the frame FQ. A result of the search is information containing identification information of the port P14 and identification information of the port P11 connected to the external node A in the switch SW1.

Then, as illustrated in FIG. 21B, the optimization part 12 of the switch SW3 sends an optimization setting frame FC4 to the switch SW1. The optimization setting frame FC4 instructs relating the port P14, which received the join message, and the port P11, which associates with the optimum path to the external node A, to a MAC address of the multicast group (hereinafter, referred to as "group MAC address"). The structure of the optimization setting frame FC4 may be the same as the path setting frame FC2 (refer to FIG. 14).

Then, as illustrated in FIG. 21C, the optimization part 12 of the switch SW1 updates the forwarding DB 14 based on the optimization setting frame FC4. Specifically, correspondence information representing a correspondence relationship between the port P14 and the group MAC address and correspondence information representing a correspondence relationship between the port P11 and the group MAC address are registered in the forwarding DB 14. Thereby, the optimum path for the multicast group is learned in the switch SW1. Thus, the relay part 13 of the switch SW1 sends the frame FJ from the port P11.

The process explained with reference to FIG. 21 is performed each time each switch SW receives the join message.

FIGS. 22A, 22B, 22C and 22D are illustrations illustrating contents of learning when the join message is received from each member in the second embodiment. In, FIGS. 22A through 22D, the cross-hatched terminals T (terminals T11, T21, T22, T32 and T41) are members of the multicast group.

Figure 22A:
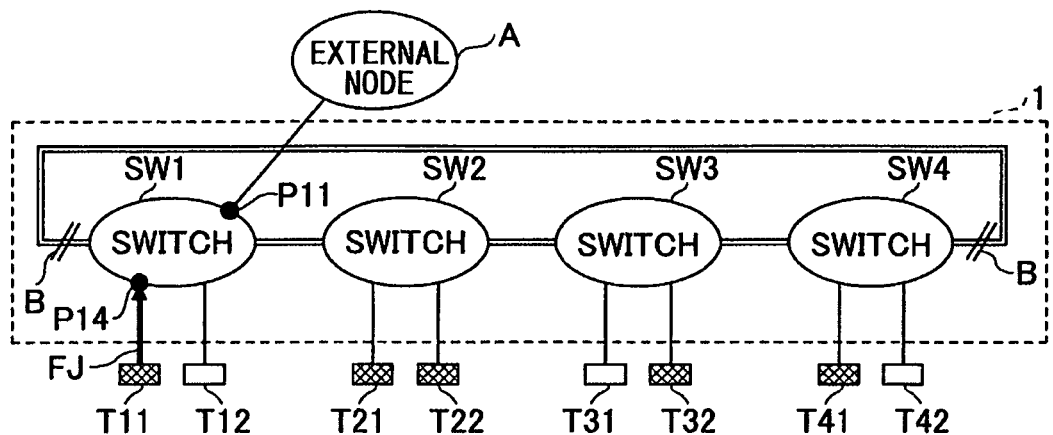
FIGS. 22A, 22B, 22C and 22D are illustrations illustrating contents of learning when a join message is received from each member in the second embodiment.

FIG. 22A illustrates the contents of learning when the switch SW1 received the frame FJ containing the join message from the terminal T11. In this case, the port P11 and the port P14 are related to the group MAC address in the forwarding DB 14 of the switch SW1 as explained with reference to FIGS. 21A, 21B and 21C.

Figure 22B:
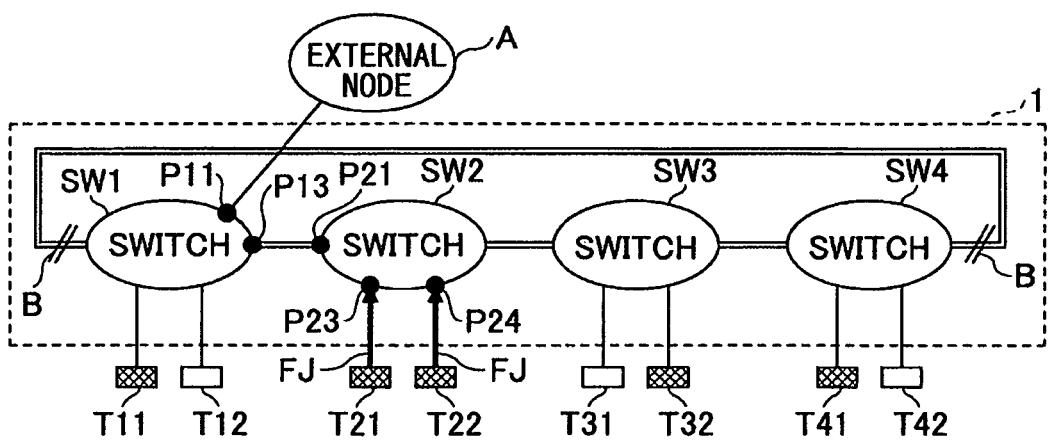

FIG. 22B illustrates the contents of learning when the switch SW2 received the frame FJ from the terminal T21 or T22. In this case, the port P21 and the ports P23 or P24 are related to the group MAC address in the forwarding DB 14 of the switch SW2. Additionally, the port P11 and the port P13 are related to the group MAC address in the forwarding DB 14 of the switch SW1. That is, in the case of FIG. 22B, the optimization part 12 of the master switch (switch SW3) searches for the optimum path to the external node A in the optimum path information based on the control frame FC3 sent from the switch SW2, the optimum path being from the port P23 or P24 to the external node A. The result of the search contains identification information of the ports P on the path to the external node A. Specifically, they are the port P23 or P24→the port P21→the port P13→the port P11. The optimization part 12 of the master switch sends the path setting frame FC4 to the switch SW having each port contained in the optimum path. In this case, as explained in the first embodiment, it is preferable to contain command to a plurality of switches in the optimization setting frame FC4. However, the optimization setting frame FC4 may be sent to each switch SW. In the case of FIG. 22B, a command for the ports P11 and P13 to the switch SW1 and a command for the port P21 and the port P23 or P24 to the switch SW2 are contained in the path setting frame FC4. The state illustrated in FIG. 22B is achieved by the optimization setting frame FC4 being transmitted to the switch SW1 and the switch SW2.

Figure 22C:
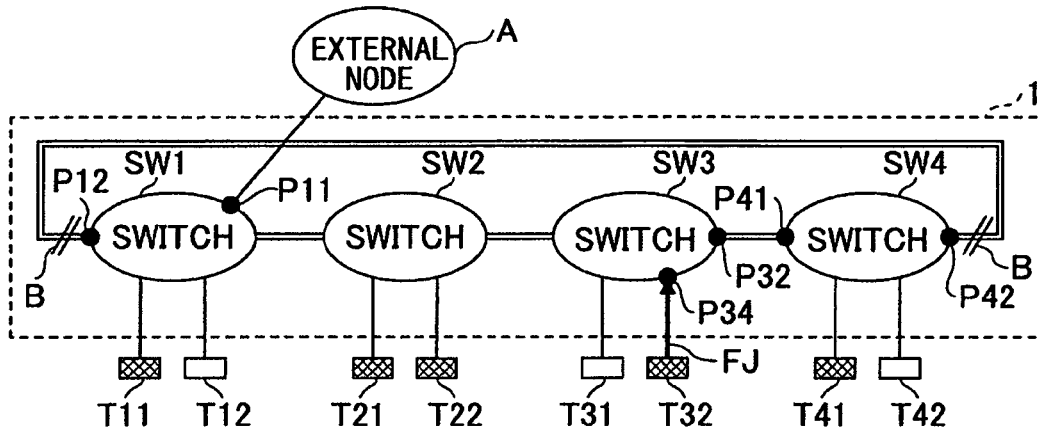

FIG. 22C illustrates the contents of learning when the switch SW3 received the frame FJ from the terminal T32. In this case, a process the same as the process explained with reference to FIG. 22B is performed so that the ports P32 and P34 are related to the group MAC address in the forwarding DB 14 of the switch SW3. Additionally, the ports P41 and P42 are related to the group MAC address in the forwarding DB 14 of the switch SW4. Further, the ports P11 and P12 are related to the group MAC address in the forwarding DB 14 of the switch SW1.

Figure 22D:
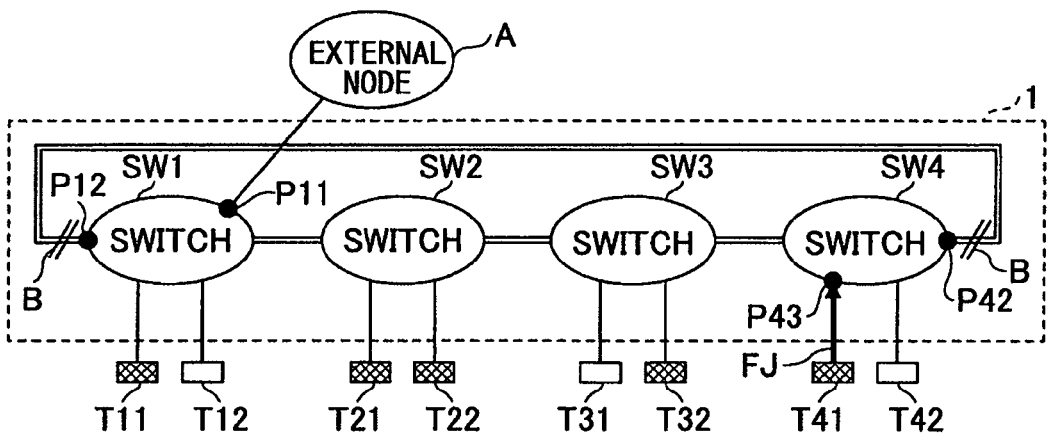

FIG. 22D illustrates the contents of learning when the switch SW4 received the frame FJ from the terminal T41. In this case, a process the same as the process explained with reference to FIG. 22B is performed so that the ports P42 and P43 are related to the group MAC address in the forwarding DB 14 of the switch SW4. Additionally, the ports P11 and P12 are related to the group MAC address in the forwarding DB 14 of the switch SW1.

Figure 23A:
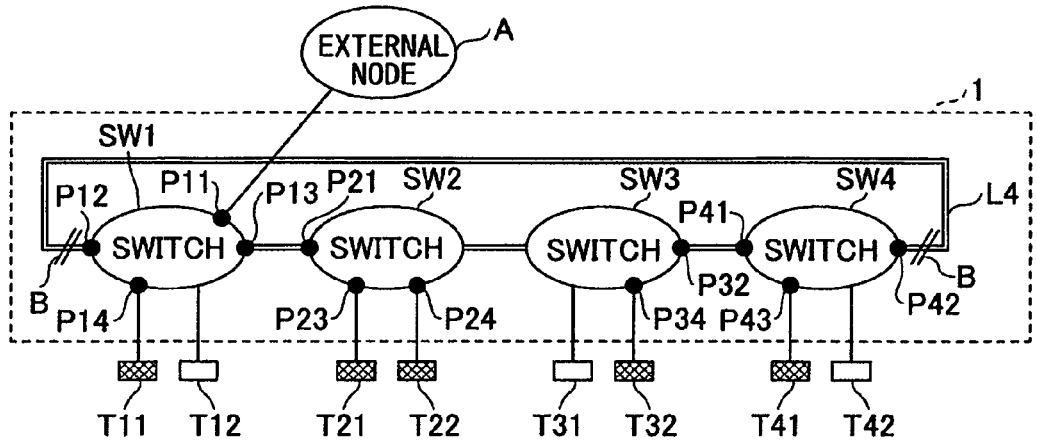
FIGS. 23A and 23B are illustrations illustrating an optimized relay path in association with a multicast frame in the second embodiment.
Figure 23B:
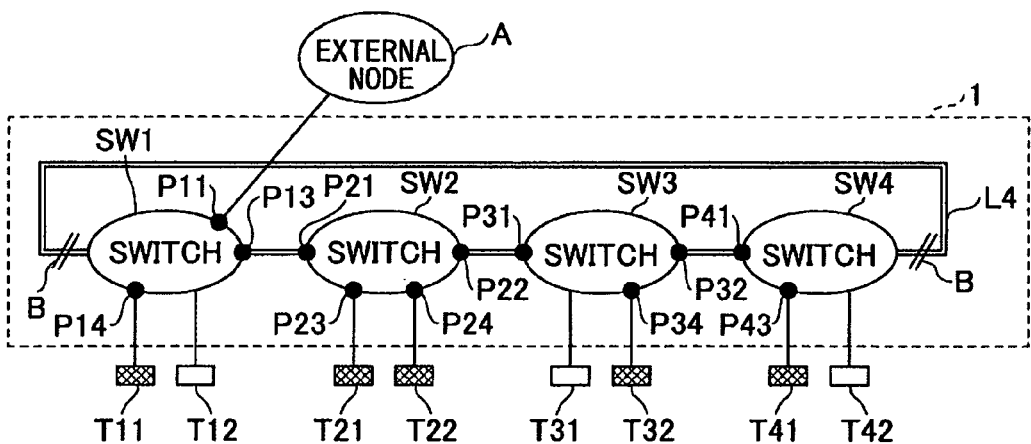

Therefore, join messages are received from all terminals T of the members, and, when the process explained with reference to FIGS. 21A through 21C and FIGS. 22A through 21D is performed, a relay path in association with the multicast frame is optimized as illustrated in FIGS. 23A and 23B.

FIGS. 23A and 23B are illustrations illustrating an optimized relay path in association with the multicast frame in the second embodiment. FIG. 23A illustrates a result of the optimization in the present embodiment. The contents illustrated in FIG. 23A correspond to the contents obtained by overlapping the contents illustrated in FIGS. 22A through 22D.

On the other hand, FIG. 23B illustrates a result of learning which is supposedly performed by the switch stack 1 of the present embodiment according to the normal IGMP snooping. In FIG. 23B, the port P received the frame FQ containing the query message and the port P received the frame FJ containing the query message are related to the group MAC address. Accordingly, in FIG. 23B, the flooding suppression ports (ports P21 and P42) are not related to the group MAC address. As a result, the stack link L4 is not used. This is because the frame FQ is not flooded at the flooding suppression port at the time of flooding the frame FQ, as illustrated in FIG. 19. In other words, it is because the flooding suppression port does not receive the frame FQ at the time of flooding the frame FQ.

Therefore, when the multicast frame is sent from the external node A in the state of FIG. 23B, the multicast frame concerned reaches the terminal T41 by way of the switch SW1→the switch SW2→the switch SW3→switch SW4.

On the other hand, when the multicast frame is transmitted from the external node A in the state of FIG. 23A, the multicast frame concerned can reach the terminal 41 by way of the switch SW1→4 the switch SW4 with a less hop count than that of FIG. 21B. This is because the flooding suppression port is effectively used in the present embodiment.

As mentioned above, according to the second embodiment, the same effect as the first embodiment can also be obtained with respect to the multicast frame.

In the switch stack 1, the join message is not always received after the query message. For example, a node newly added to the multicast group may notify of a multicast group of the node by a join message before receiving a query message. Thus, a description will be given of a case, as a third embodiment, where a join message (frame FJ) is received before receiving a query message (frame FQ).

FIGS. 24A through 24G are illustrations for explaining an operation of the switch stack when a join message is received before receiving a query message in the third embodiment.

Figure 24A:
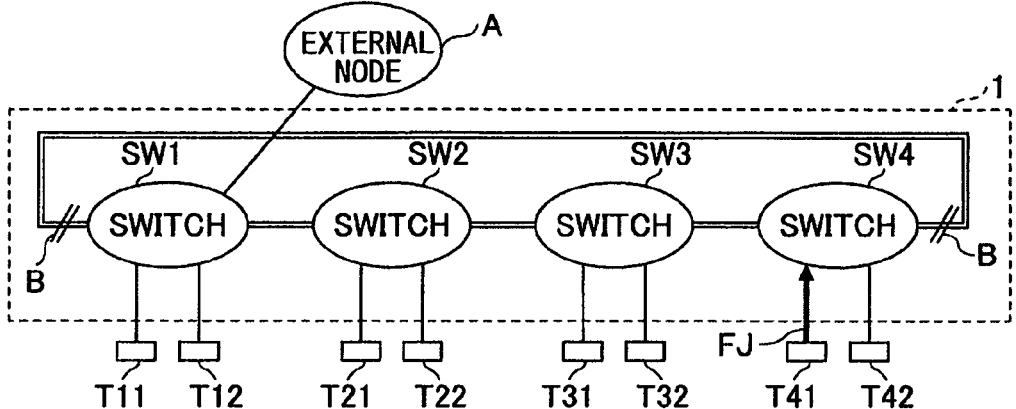
FIGS. 24A through 24G are illustrations for explaining an operation of a switch stack when a join message is received before receiving a query message in a third embodiment.
Figure 24B:
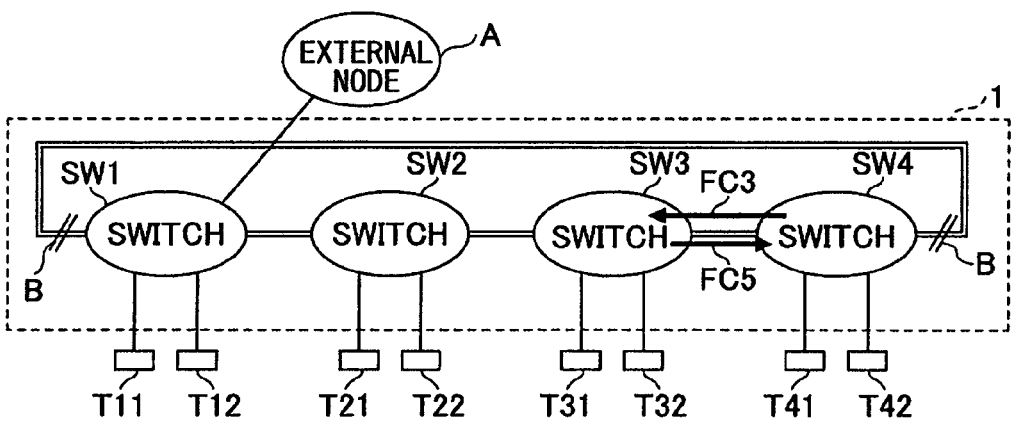

FIG. 24A illustrates an example in which the relay part 13 of the switch SW4 received the frame FJ containing a Join message from the terminal T41. In this case, as illustrated in FIG. 24B, the optimization part 12 of the switch SW4 traps the join message, and transfers the control frame FC3 containing the join message concerned and an identifier of the reception port to the master switch (switch SW3). The optimization part 12 of the switch SW3 stores the identifier of the reception port contained in the control frame FC3 in a memory.

At this stage, the switch stack 1 has not received the query message. An optimum path has not been computed by the optimization part 12 of the switch SW3, and the optimum path information has not been created. Accordingly, a search for the optimum path cannot be performed.

Thus, as illustrated in FIG. 24B, the optimization part 12 of the switch SW3 sends a control frame FC5 containing a command to instruct an execution of a predetermined (normal) relay process to the switch SW4.

Figure 24C:
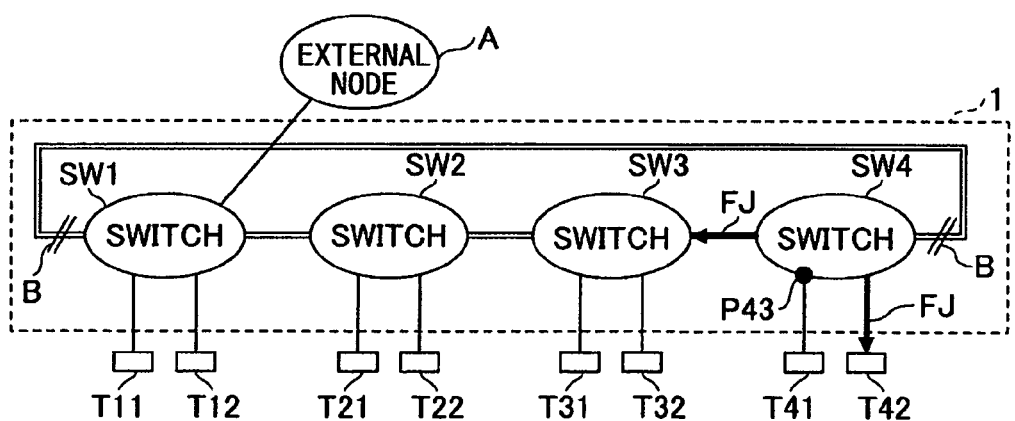

Upon reception of the control frame FC5, as illustrated in FIG. 24C, the relay part 13 of the switch SW4 registers in the forwarding DB 14 correspondence information representing a correspondence relationship between the port received the control frame FC5 and the group MAC address (the destination MAC address of the frame FJ). The relay part 13 of the switch SW4 causes the frame FJ to flood from ports other than the flooding suppression port.

Figure 24D:
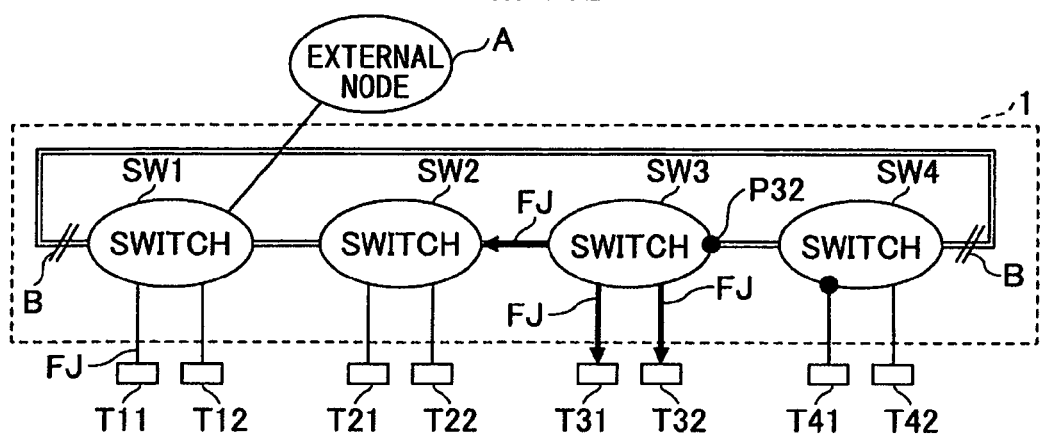

Then, the relay part 13 of the switch SW3, which received the frame FJ subjected to the flooding, notifies the optimization part 12 of the switch SW 3 of the fact that the frame FJ is received and an identifier of the reception port. The optimization part 12 stores the reception port concerned in a memory. The optimization part 12 instructs the relay part 13 to execute the predetermined relay process because there is no optimum path information available. Thus, as illustrated in FIG. 24D, the relay part 13 of the switch SW3 registers in the forwarding DB 14 correspondence information representing a correspondence relationship between the port P32 received the frame FJ and the group MAC address (the destination MAC address of the frame FJ). The relay part 13 of the switch SW3 causes the frame FJ to flood.

Figure 24E:
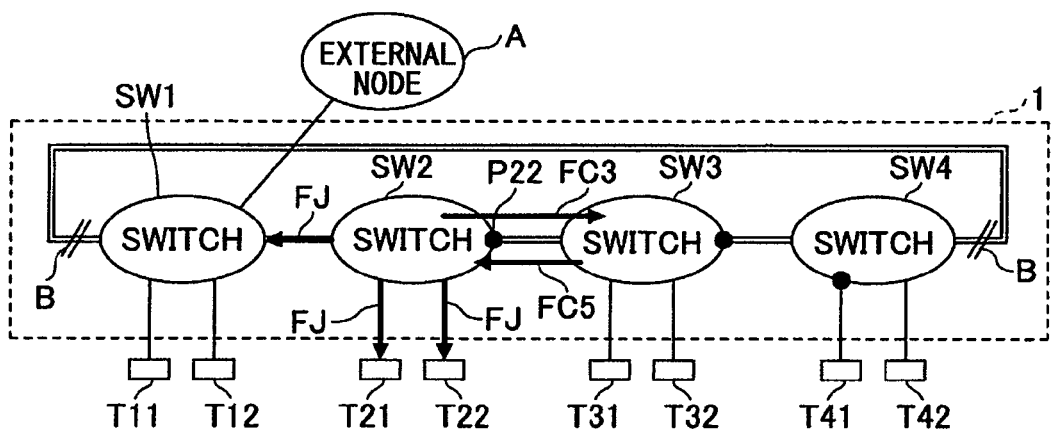

Then, the relay part 13 of the switch SW2, which received the frame FJ flooded by the switch SW3, notifies the optimization part 12 of the switch SW2 of the fact that the frame FJ has been received and an identifier of the reception port. The optimization part 12 transfers, as illustrated in FIG. 24E, the control frame FC3 containing the join message contained in the frame FJ and the identifier of the reception port to the master switch (switch SW3). The optimization part 12 of the switch SW3 stores the reception port in a memory. Additionally, the optimization part 12 sends to the switch SW2 a control frame FC5 containing a command to instruct an execution of a predetermined relay process because there is no optimum path information available. The relay part 13 of the switch SW2 registers in the forwarding DB 14 correspondence information representing a correspondence relationship between the port P22 received the frame FJ and the group MAC address (the destination MAC address of the frame FJ). The relay part 13 of the switch SW2 causes the frame FJ to flood.

Figure 24F:
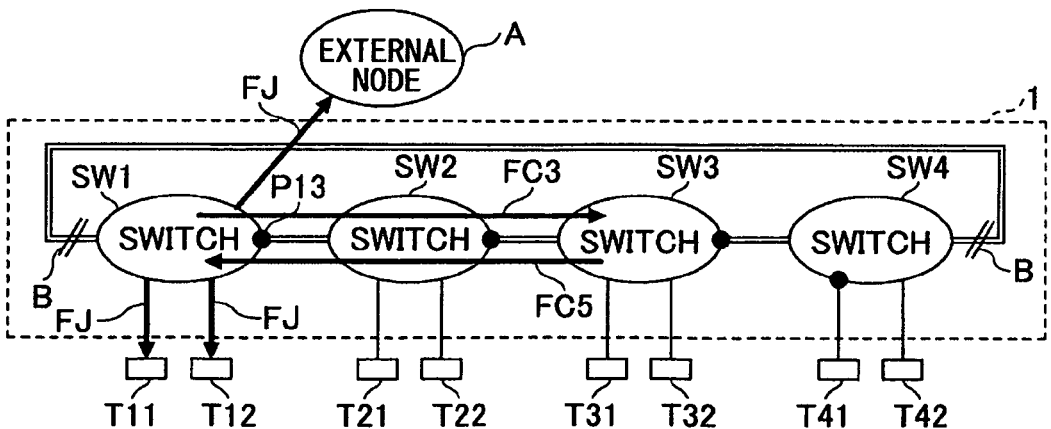

Then, the relay part 13 of the switch SW1, which received the frame FJ flooded by the switch SW2, notifies the optimization part 12 of the switch SW1 of the fact that the frame FJ has been received and an identifier of the reception port. The optimization part 12 transfers, as illustrated in FIG. 24F, the control frame FC3 containing the join message contained in the frame FJ and the identifier of the reception port to the master switch (switch SW3). The optimization part 12 of the switch SW3 stores the reception port in a memory. Additionally, the optimization part 12 sends to the switch SW1 a control frame FC5 containing a command to instruct an execution of a predetermined relay process because there is no optimum path information available. The relay part 13 of the switch SW1 registers in the forwarding DB 14 correspondence information representing a correspondence relationship between the port P13 received the frame FJ and the group MAC address (the destination MAC address of the frame FJ). The relay part 13 of the switch SW1 causes the frame FJ to flood.

Figure 24G:
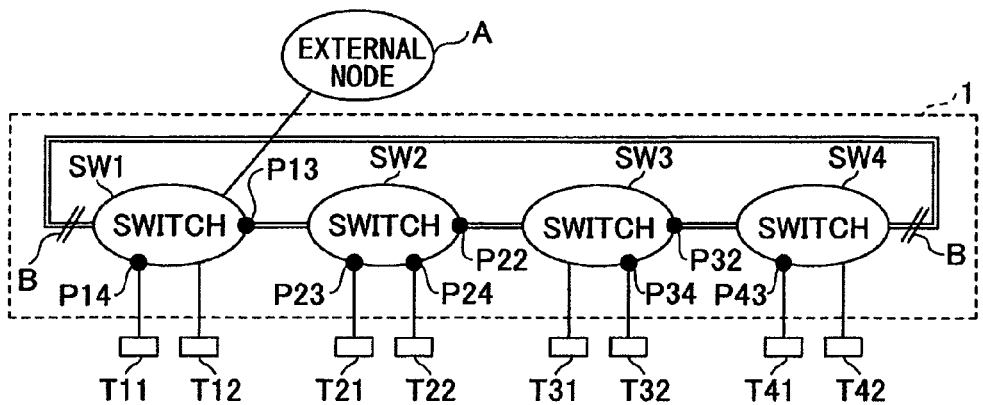

When the frame FJ containing the join message is received from members (terminals T11, T21, T22 and T23) other than the terminal T41, a process the same as the above-mentioned process is performed. As a result (as a result of the frame FJ being received from all members), the status (contents of learning) of the forwarding DB 14 of each switch SW of the switch stack 1 is set as illustrated in FIG. 24G. That is, the ports P13, P14, P22, P23, P24, P32, P34 and P43 are related to the group MAC address in the forwarding DB 14 of each switch SW to which each port belongs. As mentioned above, the identifier of the reception port of the frame FJ in each switch SW is notified to the optimization part 12 of the switch SW3, and is stored in the memory. Accordingly, the state illustrated in FIG. 24G is grasped by the optimization part 12 of the switch SW3.

A description will be given below of an operation of the switch stack when the query message is received in the state illustrated in FIG. 24G. FIGS. 24H through 24K are illustrations for explaining an operation of the switch stack when the query message is received in the third embodiment.

Figure 24H:
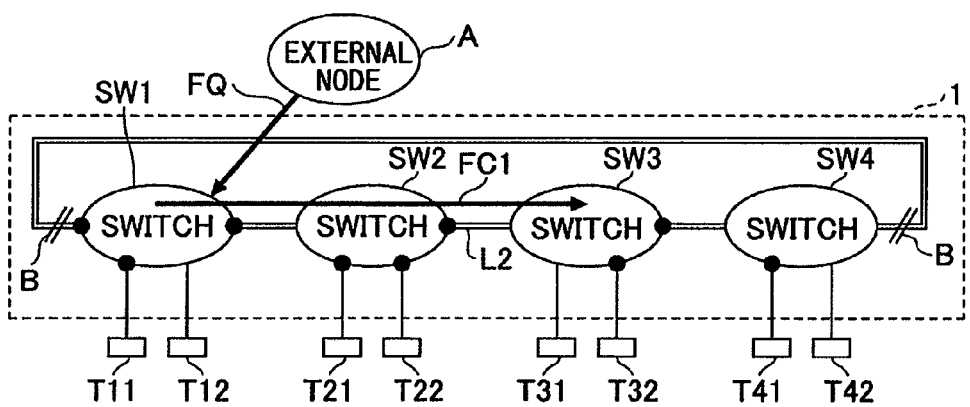
FIGS. 24H through 24K are illustrations for explaining an operation of the switch stack when a query message is received in the third embodiment.

FIG. 24H illustrates an example in which the switch SW1 received the frame FQ containing the query message from the external node A. In this case, the optimization part 12 of the switch SW1 sends the new node detection frame FC1 to the master switch (switch SW3) as the same as the second embodiment. The optimization part 12 of the switch SW3 computes an optimum path based on the topology information of the switch stack 1 and a group of identifiers of the reception ports of the frame FJ stored in the memory. However, identifiers of all of the reception ports of the frame FJ are not used but identifiers of the ports P connected to the terminals T of the members are used. The optimum path information created as a result of computation is information indicating an optimum path from each of the ports P contained in a join reception port list to the external node A (the reception ports of the frame FQ from the external node A). In the present embodiment, it is an optimum path from each of the ports P14, P23, P24, P32, P34 and P43 to the port P11. It can be determined as to which port P is connected to the terminal T from among all ports that received the frame FJ based on the topology information.

The result of computation of the optimum path in the third embodiment is the same as that of the second embodiment. Accordingly, in the relay of the multicast frame, the stack link L2 is not used. Thus, the optimization part 12 of the switch SW3 first creates a command for canceling relating to the group MAC address with respect to the port P connected to the stack link L2. Then, the optimization part 12 of the switch SW3 creates a command to relate the port P used in one of the optimum paths computed for each port P contained in the join reception port list to the group MAC address. This command is created on an individual switch SW basis.

Figure 24I:
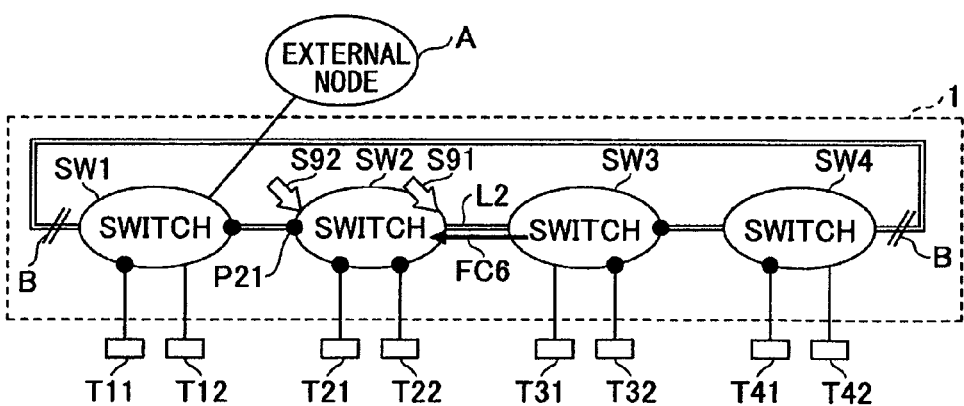

Then, the optimization part 12 of the switch SW3 sends an optimization setting frame FC6, which is a control frame containing a command to each switch SW, to each switch SW. For example, FIG. 24I illustrates an example in which the optimization setting frame FC6 is sent to the switch SW2. The optimization part 12 of the switch SW2 deletes form the forwarding DB 14 the correspondence information representing a correspondence relationship between the port P22 and the group MAC address based on the command contained in the optimization setting frame FC6 (S91). Moreover, the optimization part 12 of the switch SW2 stores in the forwarding DB 14 the correspondence information representing a correspondence relationship between the port P21 and the group MAC address based on the command contained in the optimization setting frame FC6 (S92).

Figure 24J:
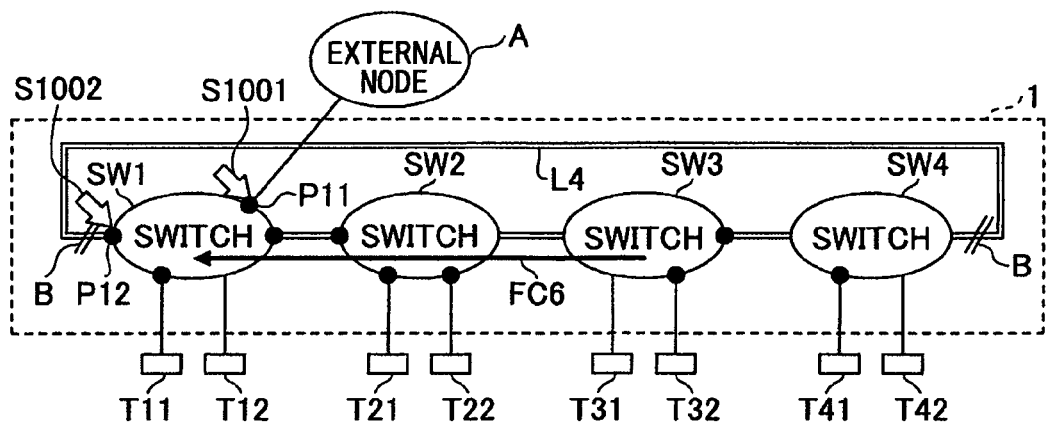

FIG. 24J illustrates an example in which the optimization setting frame FC6 is sent to the switch SW1. The optimization part 12 of the switch SW1 stores in the forwarding DB 14 the correspondence information representing a correspondence relationship between the port P11 and the group MAC address based on the command contained in the optimization setting frame FC6 (S1001). Additionally, the optimization part 12 of the switch SW1 stores in the forwarding DB 14 the correspondence information representing a correspondence relationship between the port P12 and the group MAC address based on the command contained in the optimization setting frame FC6 (S1002). Because the port P12 is related to the group MAC address, the multicast frame can be sent from the port P12, which is the flooding suppression port, to the stack link L4.

Figure 24K:
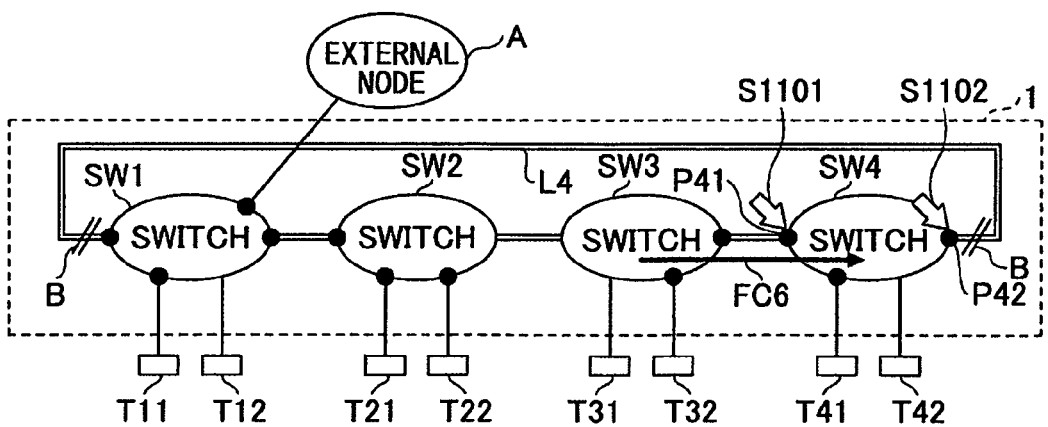

FIG. 24K illustrates an example in which the optimization setting frame FC6 is sent to the switch SW4. The optimization part 12 of the switch SW4 stores in the forwarding DB 14 the correspondence information representing a correspondence relationship between the port P41 and the group MAC address based on the command contained in the optimization setting frame FC6 (S1101). Additionally, the optimization part 12 of the switch SW4 stores in the forwarding DB 14 the correspondence information representing a correspondence relationship between the port P42 and the group MAC address based on the command contained in the optimization setting frame FC6 (S1102). Because the port P42 is related to the group MAC address, the multicast frame can be sent from the port P42, which is the flooding suppression port, to the stack link L4.

The structure of the optimization setting frame FC6 can be the same as the optimization setting frame FC2 (refer to FIG. 14). Therefore, commands to a plurality of switches SW may be contained in one optimization setting frame FC6 so that the optimization setting frame FC6 concerned is transmitted to each switch SW. The same result as the case of FIGS. 24H through 24K may be obtained in a case where one optimization setting frame FC 6 is transmitted to the switches SW in an order of the switch SW3→the switch SW2→the switch SW1→the switch SW4. In FIGS. 24H through 24K, an order of execution of the operations of FIG. 24J and FIG. 24K is not limited, but the operation of the FIG. 24I must be performed before the operations of FIG. 24J and FIG. 24K. Specifically, the relationship of the port P22 and the group MAC address must be cancelled before the group MAC address is related to the flooding suppression port and the stack link L4 becomes usable. This is to prevent formation of a loop in the switch stack 1 in association with the relay of the multicast frame. That is, if the operations of FIGS. 24J and 24K are performed prior to the operation of the FIG. 29I, a loop is undesirably formed in association with the relay of the multicast frame. Therefore, the optimization part 12 of the switch SW3 issues the control frame FC6 so that the cancellation of the port P22 connected to the stack link 4, which is not used in the optimum path, is performed first. Specifically, when sending the optimization setting frame (control frame) FC6 individually for each switch SW, the optimization part 12 of the switch SW3 sends the control frame FC6 to the switch SW2 first. When transmitting one control frame FC6, the optimization part 12 of the switch SW3 sets the first destination MAC address of the control frame FC6 to the MAC address of the switch SW2.

As mentioned above, according to the third embodiment, even when the join message is received prior to the query message in the switch stack 1, an effect the same as the effect of the second embodiment can be obtained.

A description will be given below of a fourth embodiment as an alternative example of the third embodiment. In the fourth embodiment, the join message (the frame FJ) is received prior to the query message (the frame FQ).

Figure 25A:
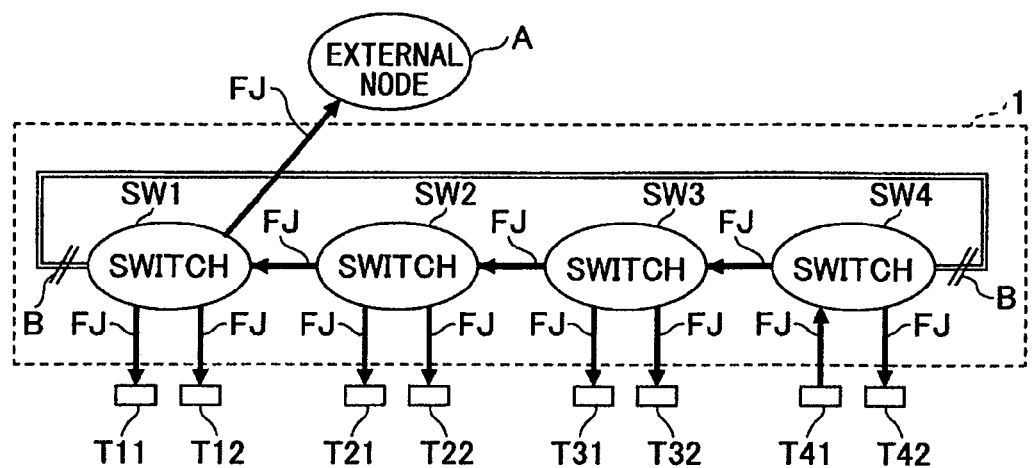
FIGS. 25A and 25B are illustrations for explaining an operation of a switch stack when a join message is received prior to a query message.
Figure 25B:
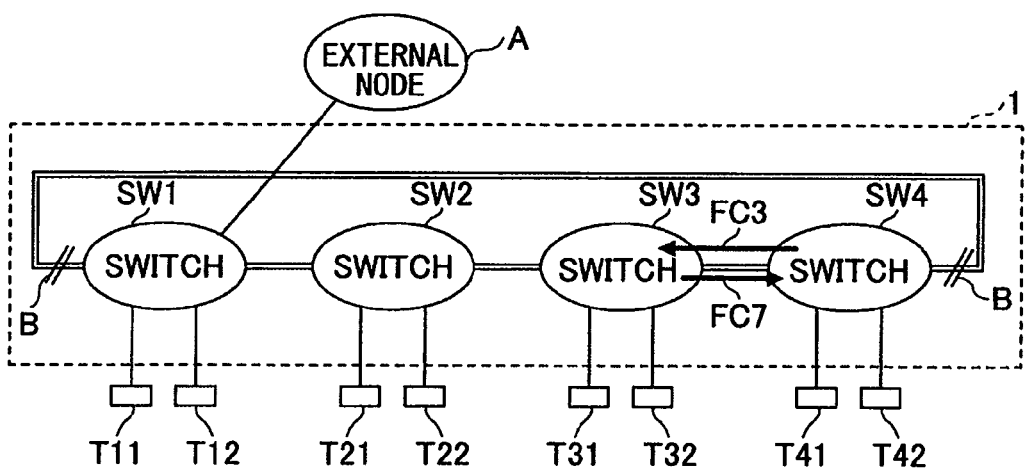

FIGS. 25A and 25B are illustrations for explaining an operation of the switch stack when the join message is received prior to the query message.

FIG. 25A illustrates an example in which the relay part 13 of the switch SW4 received the frame FJ containing the join message from the terminal T41. In this case, the frame FJ is flooded by the ports P other than the flooding suppression port and transmitted to each switch SW as illustrated in the figure. However, each switch does not perform a learning operation based on the frame FJ.

In more detail, as illustrated in FIG. 25B, the optimization part 12 of the switch SW4, which received the frame FJ, sends to the master switch (switch SW3) the control frame FC3 containing the join message contained in the frame FJ and an identifier of the reception port. The optimization port 12 of the switch SW3 sends an instruction of executing a predetermined relay process because there is no optimum path information available, and returns to the switch SW4 a control frame FC7 containing a command to instruct inexecution of learning with respect the frame FJ. The relay part 13 of the switch SW4 performs flooding as illustrated in FIG. 25A based on the command contained in the control frame FC.

The process illustrated in FIG. 25B is performed when each switch SW received the frame FJ. As a result, the forwarding DB 14 is not updated in response to reception of the frame FJ in the fourth embodiment. That is, the reception of the frame FJ is substantially ignored.

Thereafter, for example, if the frame Q containing the query message is received from the external node A, a process the same as the process of the second embodiment is performed. That is, an optimum path is computed in the switch SW3, and optimum path information is created. Then, if any one of the switches SW received the frame FJ containing the join message from the members, an optimum path is set based on the optimum path information.

Figure 26:
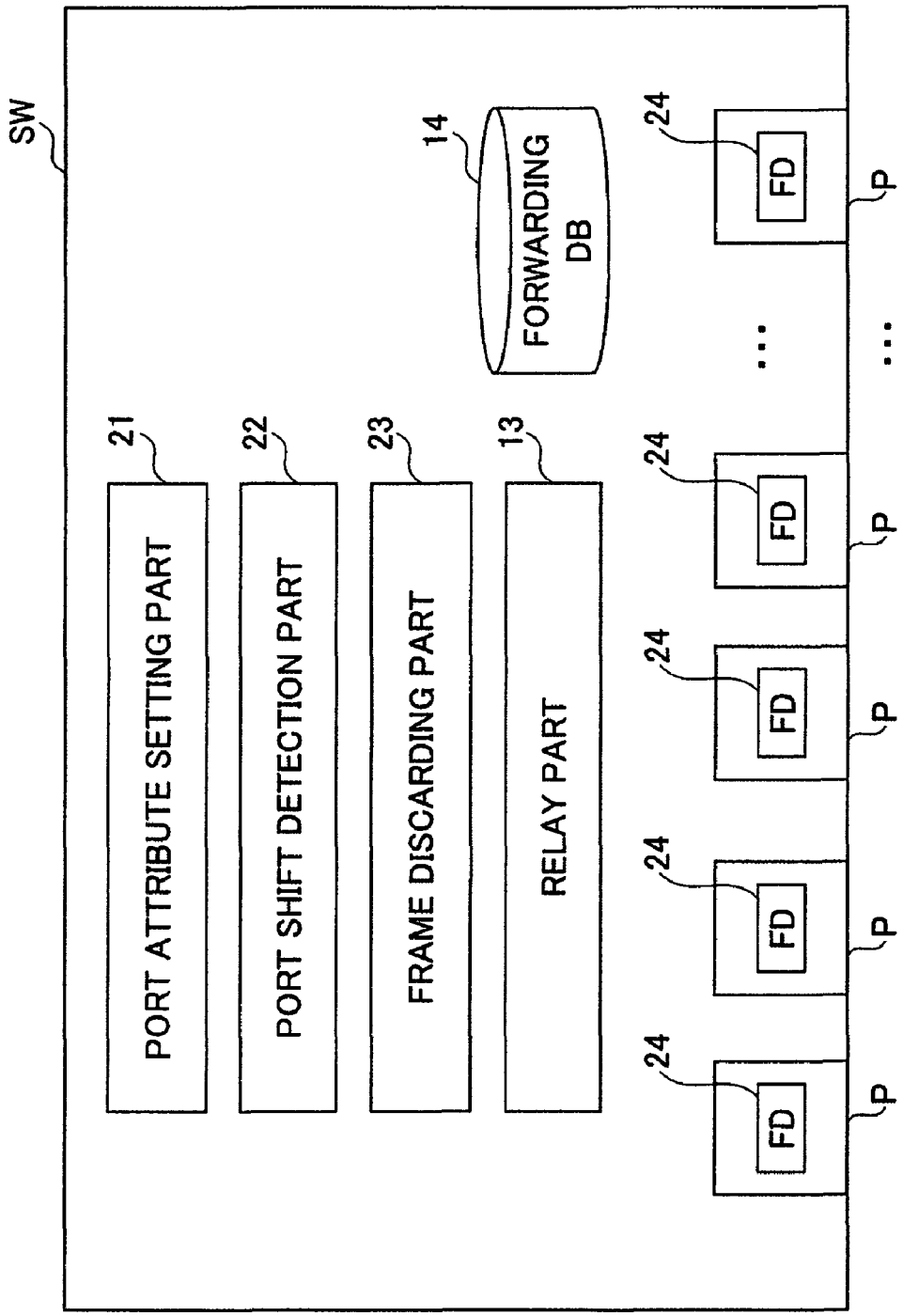
FIG. 26 is an illustration of a structure of a switch in a fifth embodiment.

A description will now be given of a fifth embodiment. FIG. 26 is an illustration of a structure of a switch in the fifth embodiment. In FIG. 26, parts that are the same as the parts illustrated in FIG. 6 are given the same reference numerals, and descriptions thereof will be omitted. The switch SW in the fifth embodiment is contained in the switch stack 1 similar to the above-mentioned embodiments.

In FIG. 26, the switch SW includes a port attribute setting part 21, a port shift detection part 22, and a frame discarding part 23. The port shift detection part 22 detects reception of a frame from the port P different from the port P which has been learned with respect a frame in which an already learned node is set to a sender MAC address (hereinafter, such a condition is referred to as "port shift"). The frame discarding part 23 discards a received frame when the port shift is detected by the port shift detection part 22.

In the fifth embodiment, each port P includes a frame discard setting memory part (FD) 24. The frame discard setting memory part 24 manages (retains) information indicating whether to discard a received frame when a frame of which destination is unlearned is received from a corresponding port P. For example, the frame discard setting memory part 24 is realized as a memory area of 1 bit of a memory in each port P. If a value (bit) of the frame discard setting memory part 24 is ON (1), it indicates that the frame of which destination is unlearned received from the port P concerned should be discarded. If the value of the frame discard setting memory part 24 is OFF (0), it indicates that there is no limitation in relaying the frame received from the port P concerned.

The port attribute setting part 21 sets the value of the frame discard setting memory part 24 of the port P set as an object to be set to ON or OFF according to an instruction input of setting to the frame discard setting memory part 24. The instruction input to the port attribute setting part 21 may be input through a hardware interface (an operation button, etc.) of the switch SW, or may be performed by an input of a frame containing a predetermined command.

In the present embodiment, the value of the frame discard setting memory part 24 is effective when the corresponding port P is connected to the stack link. Therefore, when the corresponding port P is connected to a node outside the switch stack 1, the value of the frame discard setting memory part 24 is not referred to. Additionally, in each switch SW belonging to the switch stack 1, the value of the frame discard setting memory part 24 is set to ON only for one port P connected to the stack link. Therefore, the values of the frame discard setting memory parts 24 of other ports P are set to OFF.

FIG. 27 is a flowchart for explaining an operation of the switch according to the fifth embodiment when receiving a frame.

If a frame is received in the switch SW, the relay part 13 searches for an entry to the sender MAC address of the received frame in the forwarding DB 14 (S501). If the corresponding entry is found (YES of S501), the port shift detection part 22 determines whether the reception port of the received frame is one registered in the entry concerned (S503). That is, it is determined whether the contents of reception and the contents of learning are coincident with each other.

If the reception port of the received frame is not one registered in the entry concerned (NO of S503), the port shift detection part 22 detects a port shift. Then, the frame discarding part 23 discards the received frame (S504). Therefore, in this case, a relay process of the received frame is not performed in this case.

If the reception port of the received frame is one registered in the entry concerned (YES of S503), the relay part 13 sends or floods the received frame from the port P corresponding to the destination MAC address in accordance with the contents of leaning in the forwarding DB 14 (S510).

On the other hand, if the entry concerned is not found (NO of S502), the relay part 13 checks whether forwarding DB 14 is in a saturated state (full state) (S505). The saturated state of the forwarding DB 14 means a state where an entry cannot be added any more. That is, a number of entries which can be registered in the forwarding DB 14 is limited.

If the forwarding DB 14 is not in the saturated state (NO of S505), the relay part 13 registers in the forwarding DB 14 the correspondence information representing a correspondence relationship between the reception port and the sender MAC address of the received frame (S506). Subsequently, the relay part 13 performs a relay process of the received frame (S510).

If the forwarding DB 14 is in the saturated state (YES of S505), the relay part 13 determines whether the reception port is a port P connected to the stack link (that is, a redundant link) or a port P connected to outside (the external node A, terminals T, etc.) of the switch stack 1 (S507). Such a determination can be made based on the topology information in the switch SW.

If the reception port is a port P connected to the stack link (Yes of S507), the relay part 13 determines whether the value of the frame discard setting memory part 24 of the reception port is ON (S508). If the value of the frame discard setting memory part 24 of the reception port is ON (YES of S508), the frame discarding part 23 discards the received frame (S504). Therefore, in this case, the relay process of the received frame and the learning process based on the received frame are not performed. If the value of the frame discard setting memory part 24 of the reception port is OFF (NO of S508), the relay part 13 performs the relay process of the received frame. However, in this case, the learning process based on the received frame is not performed.

On the other hand, if the reception port is a port P connected to one other than the stack link (that is, outside the stack link 1) (NO of S507), the relay part 13 creates an empty entry in the forwarding DB 14, and register the contents of learning based on the reception port in the empty entry (S509). Therefore, in the present embodiment, the relay part 13 is an example of a correspondence information updating part. The creation of the empty entry in the forwarding DB 14 means deletion of correspondence information registered in the forwarding DB 14. The corresponding information to be deleted may be selected, for example, based on a criterion that a registered time is early or a number times of use is small, or may be selected arbitrarily. The contents of learning based on the reception frame means the correspondence information representing a corresponding relationship between the reception port and the sender MAC address of the reception frame. Subsequently, the relay part 13 performs the relay process of the reception port (S510).

Figure 28A:
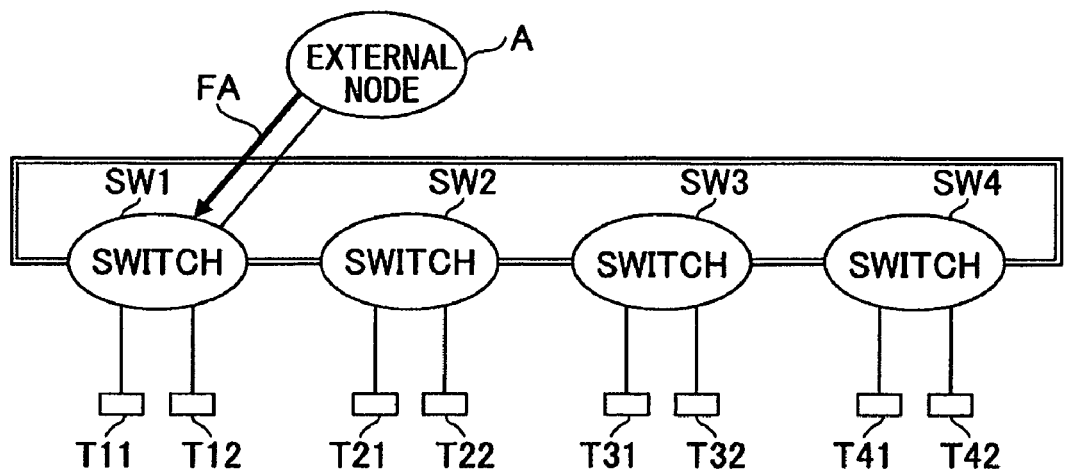
FIGS. 28A through 28D are illustrations for explaining an operation of a switch stack when the contents of reception do not match the contents of a forwarding DB in the fifth embodiment.
Figure 28B:
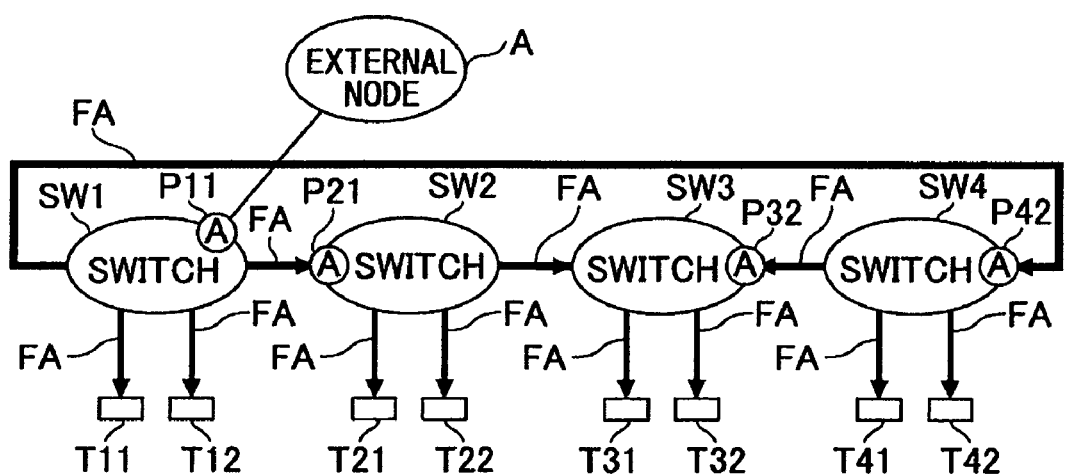
Figure 28C:
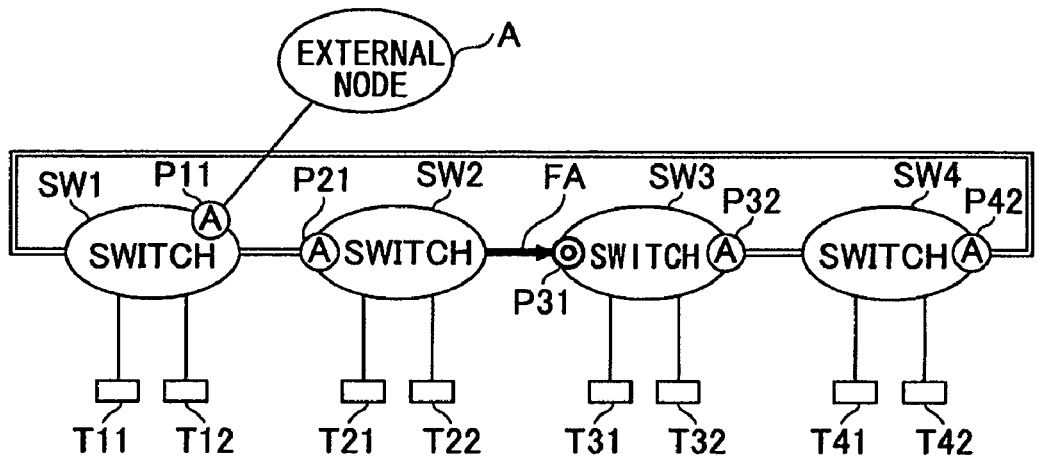
Figure 28D:
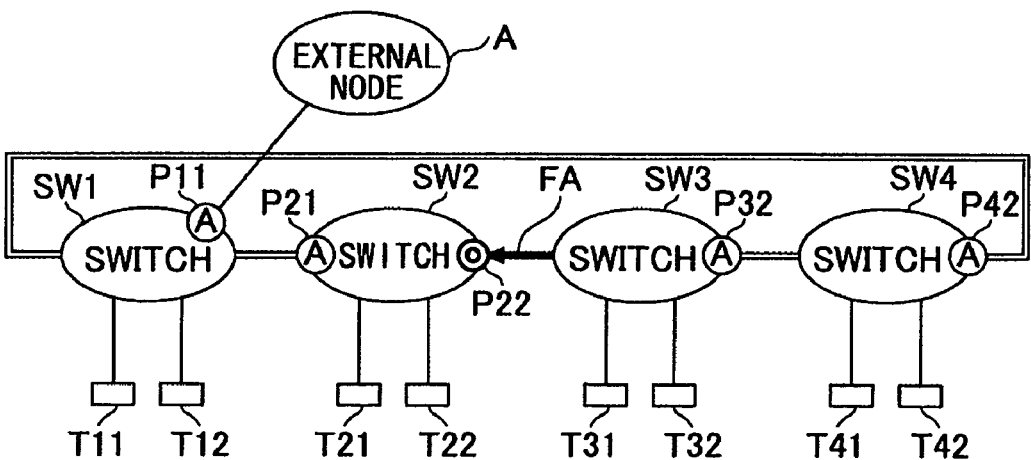
Figure 29A:
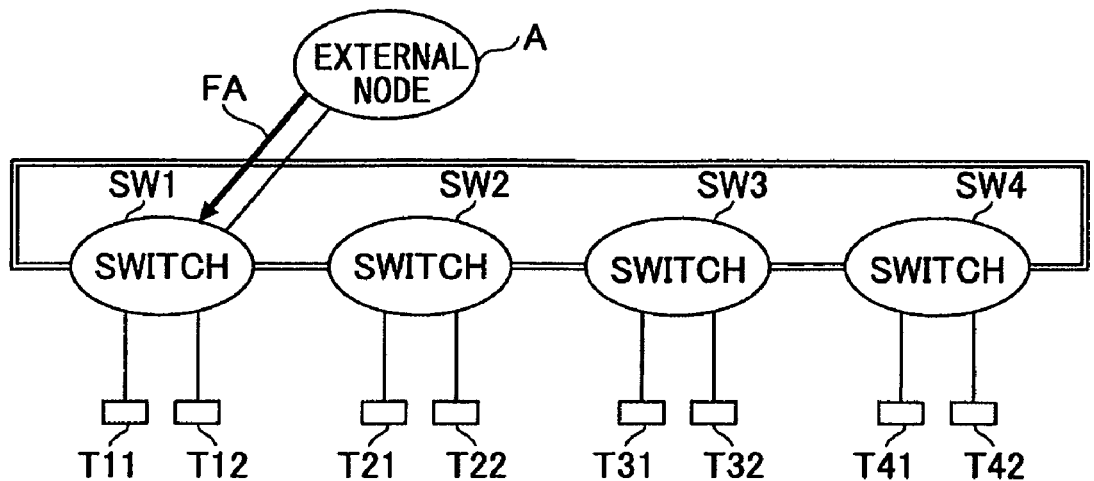
FIGS. 29A and 29B are illustrations for explaining an operation of a switch stack when the forwarding DB is in a saturated state in the fifth embodiment.
Figure 29B:
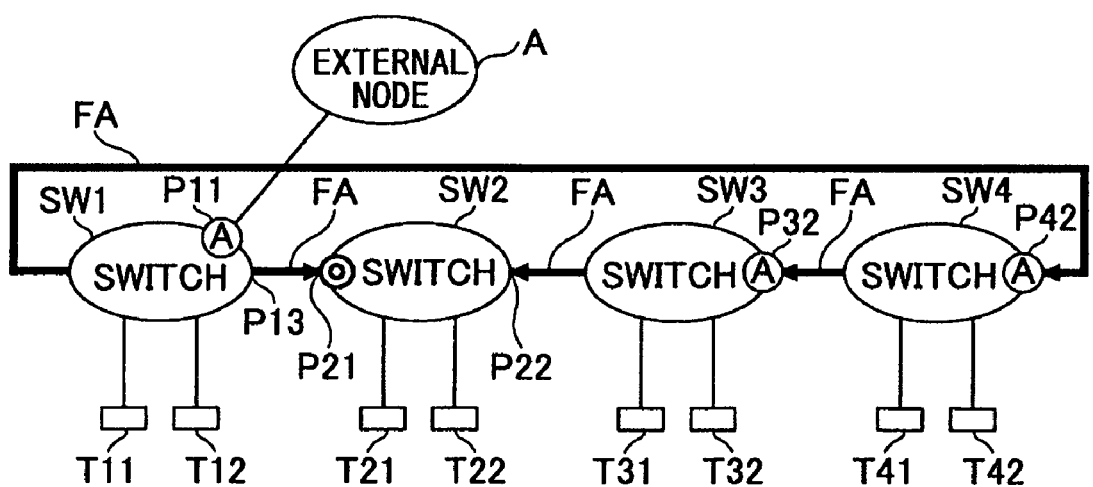

Because the process of FIG. 27 is performed in each switch SW, the process such as illustrated in FIGS. 28A through 28D and the process illustrated in FIGS. 29A and 29B are achieved in the switch stack 1 as a whole.

FIGS. 28A through 28D are illustrations for explaining an operation of the switch stack when the contents of reception do not match the contents of the forwarding DB in the fifth embodiment. That is, it is an operation of the switch stack 1 when the determination of step S503 of FIG. 27 is NO.

FIG. 28A illustrates reception of the frame FA from the unlearned external node A in the switch SW1. In this case, as illustrated in FIG. 28B, the frame FA is flooded in each switch SW, and the correspondence information representing a' correspondence relationship between the external node A and the reception port is registered in the forwarding DB 14 of each switch SW. That is, the port P11 is related to the external node A in the switch SW1. The port P21 is related to the external node A in the switch SW2. The port P32 is related to the external node A in the switch SW3. The port P42 is related to the external node A in the switch SW4. In this example, it is assumed that the frame FA arrives the switch SW3 first on the right side thereof (on the SW4 side).

Then, as illustrated in FIG. 28C, the switch SW3 receives the frame FA, which was flooded in the switch SW2, through the port P31. Then, the switch SW3 performs the process of steps S501, S502, S503 and S504 of FIG. 27. This is because the frame FA of which sender is the external node A is received from the port P31 different from the port P32 although the external node A is related to the port P32 in the switch SW3. As a result, the switch SW3 detects the port shift, and discards the frame FA. The double-circle ⊚ indicated in FIG. 28C represents a port of which value of the frame discard setting memory part 24 is set to ON.

Similarly, as illustrated in FIG. 28D, the switch SW2 receives the frame FA, which was flooded in the switch SW3, through the port P22. Then, the switch SW2 performs the process of step S501, YES of step S502, NO of step S503 and step S504 of FIG. 27. This is because the frame FA of which sender is the external node A is received from the port P22 different from the port P21 although the external node A is related to the port P21 in the switch SW2. As a result, the switch SW2 detects the port shift, and discards the frame FA.

As a result of the above-mentioned process, formation of a loop of the frame FA is avoided in the switch stack 1. Because the formation of loop is avoided, the frame FA is prevented from being overlapped and being flooded to the terminals T. Additionally, a probability of the optimum path (shortest path) to the external node A being learned becomes high. However, whether the optimum path is learned depends on a load condition of the communication with each stack link.

FIGS. 29A and 29B are illustrations for explaining an operation of the switch stack when the forwarding DB is in a saturated state in the fifth embodiment.

FIG. 29A illustrates reception of the frame FA from the unlearned external node A in the switch SW1. In FIG. 29A, it is assumed that the forwarding DB 14 of the switch SW2 is in the saturated state. Additionally, it is assumed that the value of the frame discard setting memory part 24 of the port P21 is ON in the switch SW2. The double-circle ⊚ indicated in FIG. 29B represents a port of which value of the frame discard setting memory part 24 is set to ON.

Consequently, the switch SW2 performs a process such as illustrated in FIG. 29B in the process of flooding the frame FA. That is the switch SW2 performs the process of step S501, NO of step S502, YES of step S505, YES of step S507, YES of step S508 and step S504 of FIG. 27 in response to the reception of the frame FA by the port P21. As a result, the switch SW2 discards the frame FA concerned. Additionally, the switch SW2 performs the process of step S501, NO of step S502, YES of step S505, YES of step S507, NO of step S508 and step S510 of FIG. 27 in response to the reception of the frame FA by the port P22. As a result, the switch SW2 causes the frame FA to be flooded.

As mentioned above, even if the switch SW2 cannot learn the external node A, formation of a loop of the frame FA is avoided. This is because the frame FA received from the left side of the switch SW2 is discarded, and the frame FA received from the right side of the switch SW1 is flooded to the switch SW1 but discarded by the switch SW1. The frame FA is discarded by the switch SW1 because the frame FA of which sender is the external node A is received at the port P13 different from the port P11 but the external node A is related to the port P11 in the switch SW1. Because formation of a loop of the frame FA is avoided, the frame FA is prevented from being overlapped and flooded to the terminal T.

FIGS. 30A through 30D are illustrations for explaining the meaning of forcible learning by creating an empty entry when the forwarding DB is in a saturated state. That is, FIGS. 30A through 30D are illustrations for explaining the significance of step S509 of FIG. 27. In order to explain the significance of step S509, a problem arises when the process of step S509 is not performed is explained below.

Figure 30A:
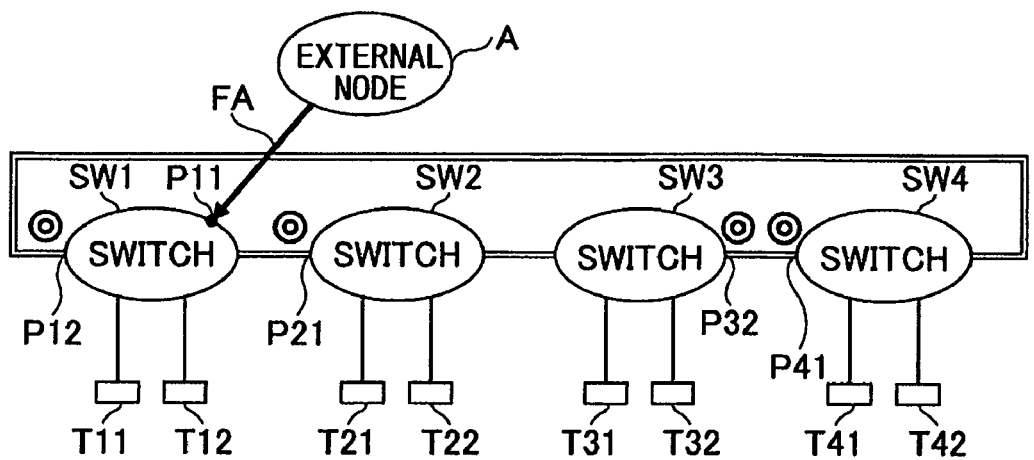
FIGS. 30A through 30D are illustrations for explaining the meaning of forcible learning by creating an empty entry when the forwarding DB is in a saturated state.

FIG. 30A illustrates reception of the frame FA from the unlearned external node A in the switch SW. In FIG. 30A, it is assumed that the forwarding DB 14 of the switch SW1 is in a saturated stated. Also it is assumed that the value of the frame discard setting memory part 24 of each of the ports P12, P21, P32 and P41 is ON. In FIG. 30A, the double circle ⊚ represents a port of which value of the frame discard setting memory part 24 is ON.

Figure 30B:
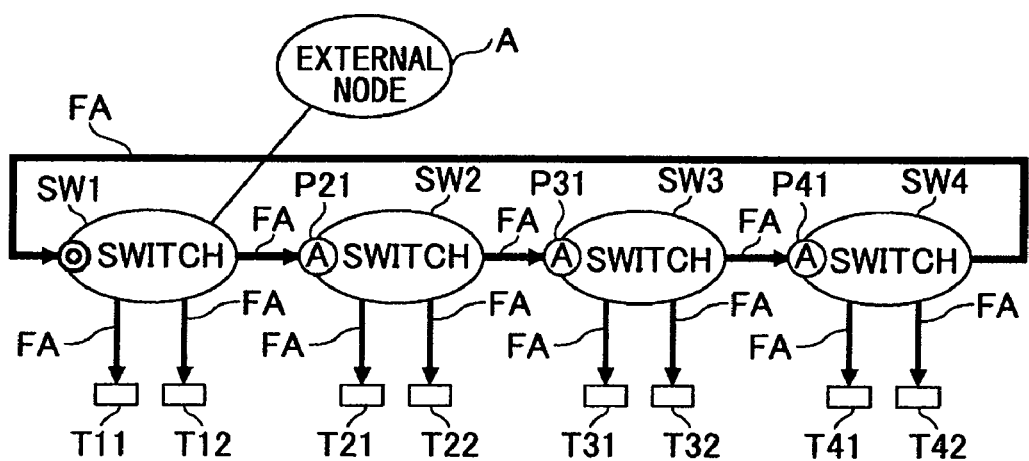

In the switch SW1, the reception port P11 of the frame FA is not a port P connected to the stack link. Therefore, the switch SW1 performs the process of step S501, NO of step S502, YES of step S505, NO of step S507 and step S510 of FIG. 27. As mentioned above, the process of step S509 is not performed. As a result, the frame FA is flooded, and the external node A is learned as illustrated in FIG. 30B.

That is, the port P21 is related to the external node A in the switch SW2. The port P31 is related to the external node A in the switch SW3. The port P41 is related to the external node A in the switch SW4. On the other hand, leaning of the external node A is not performed in the switch SW1. However, according to the operation explained with reference to FIG. 28A through FIG. 28D, formation of a loop of the frame FA is prevented. Specifically, the frame FA, which is flooded from the switch SW4 to the switch SW1, is discarded because the value of the frame discard setting memory part 24 of the port P21 is ON. It is assumed that the forwarding DB 14 of the switch SW4 is in a saturated state according to the learning as illustrated in FIG. 30B.

Figure 30C:
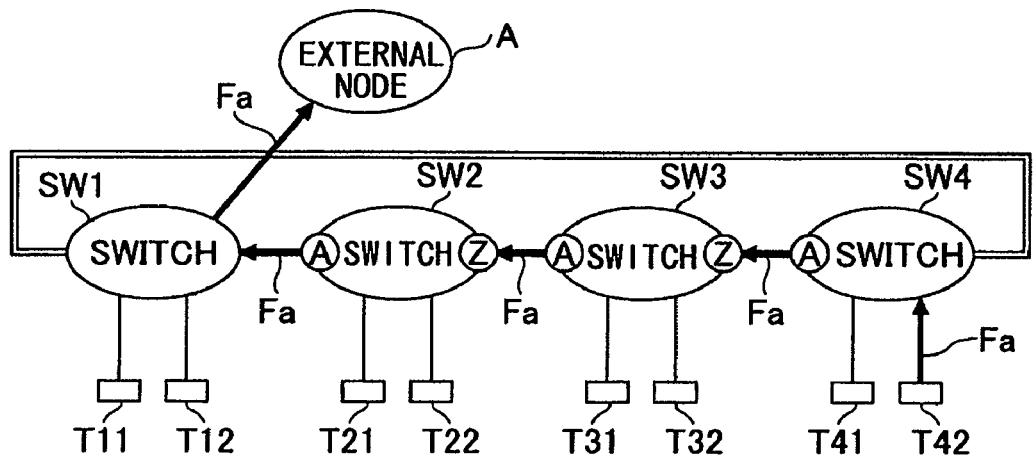

Then, as illustrated in FIG. 30C, it is assumed that the switch SW4 receives the frame Fa addressed to the external node A at the unlearned terminal T42. In this case, the switch SW4 sends the frame Fa from the port P41 based on the forwarding DB 14. However, because the forwarding DB 14 of the switch SW4 is in a saturated state, the switch SW4 cannot learn the terminal T42. Thereafter, the frame Fa is relayed to the switch SW3→the switch SW2→the switch SW1→the external node A based on the contents of learning of each switch SW. The terminal T42 is learned in each of the switches SW3 and SW4 of which the forwarding DB 14 has an empty entry. In FIG. 30C, the circle with a letter Z therein represents that the correspondence information representing a correspondence relationship between the port concerned and the MAC address of the terminal T42 is registered in the forwarding DB 14.

Figure 30D:
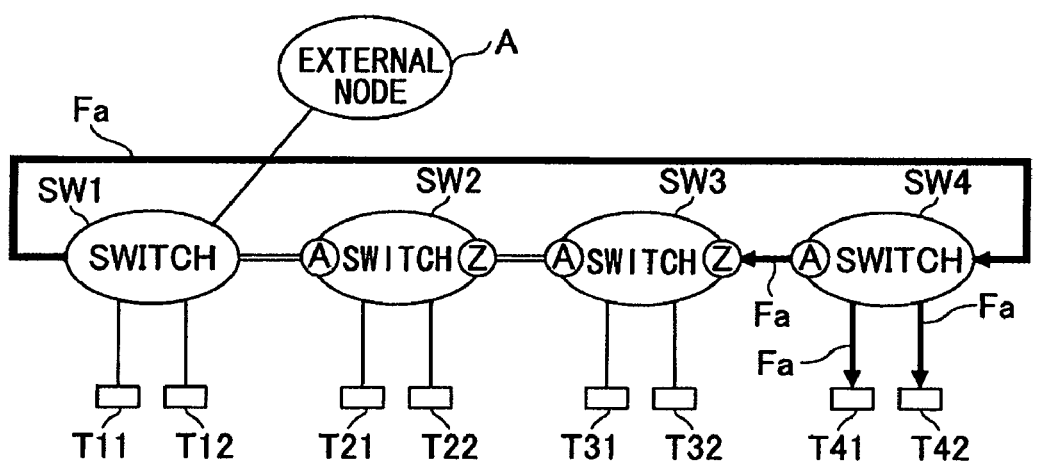

Here, the reason for causing the relay of the frame Fa from the switch SW1 to the external node A is not that the switch SW1 has learned the external node but that the switch SW1 caused the frame Fa to flood. Accordingly, as illustrated in FIG. 30D, the frame Fa is flooded to the switch SW4. Because the switch SW4 has not learned the terminal T42, the switch SW4 cannot detect that the frame Fa of which sender is the terminal T42 is received at the port P42 different from the port P44, which is connected to the terminal T42. Therefore, the switch SW4 does not discard the frame Fa, and sends out the frame Fa again from the port P41. As a result, the operations illustrated in FIGS. 30C and 30D are repeatedly performed, thereby forming a loop of the frame Fa.

The process of step S509 is performed to avoid such a problem of forming a loop of the frame Fa. That is, if the process of step S509 is performed, the switch SW1 can learn the external node A at the stage of FIG. 30A. As a result, the flooding illustrated in FIG. 30D is not performed, thereby avoiding formation of a loop of the frame Fa.

As mentioned above, according to the switch SW of the fifth embodiment, a received frame is discarded by the frame discarding part 23 in accordance with the detection of the port shift by the port shift detection part 22, which results in suppression of a frame storm. Additionally, even if there is a switch SW, which cannot learn a node due to the forwarding DB 14 being set in a saturated state, a frame storm can be suppressed based on the contents set to the frame discard setting memory part 24.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A relay device comprising:
   a first memory configured to store correspondence information representing a correspondence relationship between a node and a port;
   a second memory configured to store information by which a port to suppress flooding of a frame is distinguishable; and
   a relay part configured to limit ports, which are used to flood a frame addressed to a node of which information is not stored in said first memory, to ports other than said port to suppress flooding based on the information stored in said second memory.

2. The relay device according to claim 1 further comprising;
   a first optimization part configured to store in said first memory correspondence information representing a correspondence relationship between said port to suppress flooding and said node of which information is not stored in said first memory in accordance with a command contained in a control frame received, wherein said relay part sends a frame addressed to said node from said port to suppress flooding, which is related to said node.

3. The relay device according to claim 1, further comprising;
   a reception part configured to receive a control frame, which notifies of a detection of an external node of a network, from one of a plurality of relay devices belonging to the network, the network including a redundant path having opposite ends each of which is connected to the port to suppress flooding provided in said relay device according to claim 1; and a second optimization part configured to compute an optimum path from each of said relay devices to said external node based on identification information of a port at which said external node is detected and information representing a connection relationship between said plurality of relay devices in said network and also using said port to suppress flooding, the second optimization part configured to send a control frame containing a command designating a port to be corresponded to said external node in accordance with a result of the computation.

4. The relay device according to claim 3, wherein said second optimization part is configured to send said control frame so that one of said relay devices having said port to suppress flooding executes said command earlier than other relay devices.

5. A relay method performed by a relay device, comprising:
storing correspondence information in a first memory of said relay device, the correspondence information representing a correspondence relationship between a node and a port;
storing information by which a port to suppress flooding of a frame is distinguishable in a second memory of said relay device; and
limiting ports, which are used to flood a frame addressed to a node of which information is not stored in said first memory, to ports other than said port to suppress flooding based on the information stored in said second memory.

6. The relay method according to claim 5, further comprising;
storing in said first memory correspondence information representing a correspondence relationship between said port to suppress flooding and said node of which information is not stored in said first memory in accordance with a command contained in a control frame received; and
sending a frame addressed to said node from said port to suppress flooding, which is related to said node.

7. The relay method according to claim 5, further comprising;
receiving a control frame, which notifies of a detection of an external node of a network, from one of a plurality of relay devices belonging to the network, the network including a redundant path having opposite ends each of which is connected to the port to suppress flooding provided in said relay device according to claim 1; and
computing an optimum path from each of said relay devices to said external node based on identification information of a port at which said external node is detected and information representing a connection relationship between said plurality of relay devices in said network and also using said port to suppress flooding, and sending a control frame containing a command designating a port to be corresponded to said external node in accordance with a result of the computation.

8. The relay device according to claim 7, wherein sending a control frame includes sending said control frame so that one of said relay devices having said port to suppress flooding executes said command earlier than other relay devices.

9. A relay device performing a frame relay, comprising:
a first memory configured to store correspondence information representing a correspondence relationship between a node and a port;
a frame discarding part configured to discard a frame of which sender is the node of which correspondence information is stored in said first memory when the frame of which sender is the node of which correspondence information is stored is received at a port different from the port to which the node of which correspondence information is stored is related; and
a third memory configured to store, when a frame of which destination is not stored in said first memory is received, information indicating that said frame of which destination is not stored in said first memory should be discarded,
wherein said discarding part discards a frame, which is received at a port connected to a redundant path and a destination thereof is not stored in said third memory, based on the information stored in said third memory when said first memory is in a saturated state.

10. The relay device according to claim 9, further comprising a correspondence information updating part configured to replace, when a frame of which destination is a node of which information is not stored in said first memory is received at a port connected to said redundant path and when said first memory is in a saturated state, said correspondence information by correspondence information representing a correspondence relationship between the node of which information is not stored in said first memory and the port connected to said redundant path.

11. A relay method performed by a relay device performing a frame relay, comprising:
storing correspondence information representing a correspondence relationship between a node and a port in a first memory;
discarding a frame of which sender is a node of which correspondence information is stored in said first memory when the frame is received at a port different from the port to which the node of which correspondence information is stored is related; and
storing in a third memory, when a frame of which destination is not stored in said first memory is received, information indicating that the frame of which destination is not stored in said first memory should be discarded,
wherein said discarding a frame including discarding a frame, which is received at a port connected to a redundant path and a destination thereof is not stored in said third memory, based on the information stored in said third memory when said first memory is in a saturated state.

12. The relay method according to claim 11, further comprising updating said first memory by replacing, when a frame of which destination is a node of which information is not stored in said first memory is received at a port connected to said redundant path and when said first memory is in a saturated state, the correspondence information by correspondence information representing a correspondence relationship between the node of which information is not stored in said first memory and the port connected to said redundant path.

* * * * *